United States Patent
Kobayashi et al.

(10) Patent No.: US 11,835,096 B2
(45) Date of Patent: Dec. 5, 2023

(54) PLUNGING TYPE CONSTANT VELOCITY UNIVERSAL JOINT FOR PROPELLER SHAFT

(71) Applicant: NTN Corporation, Osaka (JP)

(72) Inventors: Masazumi Kobayashi, Shizuoka (JP); Tomoshige Kobayashi, Shizuoka (JP)

(73) Assignee: NTN CORPORATION, Osaka (JP)

( * ) Notice: Subject to any disclaimer, the term of this patent is extended or adjusted under 35 U.S.C. 154(b) by 492 days.

(21) Appl. No.: 17/045,277

(22) PCT Filed: Apr. 12, 2019

(86) PCT No.: PCT/JP2019/016030
§ 371 (c)(1),
(2) Date: Oct. 5, 2020

(87) PCT Pub. No.: WO2019/208277
PCT Pub. Date: Oct. 31, 2019

(65) Prior Publication Data
US 2021/0172481 A1 Jun. 10, 2021

(30) Foreign Application Priority Data

Apr. 24, 2018 (JP) .................... 2018-082972
Apr. 24, 2018 (JP) .................... 2018-082973
(Continued)

(51) Int. Cl.
*F16D 3/227* (2006.01)
*F16D 3/2245* (2011.01)
*F16D 3/223* (2011.01)

(52) U.S. Cl.
CPC .......... *F16D 3/2245* (2013.01); *F16D 3/227* (2013.01); *F16D 2003/22303* (2013.01); *Y10S 464/906* (2013.01)

(58) Field of Classification Search
CPC ................ F16D 3/2245; F16D 3/227; F16D 2003/22303; Y10S 464/906
(Continued)

(56) References Cited

U.S. PATENT DOCUMENTS 6,280,338 B1  8/2001  Hayama et al.
6,299,543 B1  10/2001  Sone et al.
(Continued)

FOREIGN PATENT DOCUMENTS

JP     5-306604    11/1993
JP     10-73129     3/1998
(Continued)

OTHER PUBLICATIONS

International Search Report dated Jul. 2, 2019 in International (PCT) Application No. PCT/JP2019/016030.
(Continued)

*Primary Examiner* — Greg Binda
(74) *Attorney, Agent, or Firm* — WENDEROTH, LIND & PONACK, L.L.P.

(57) ABSTRACT

A plunging type constant velocity universal joint 1 for a propeller shaft includes an outer joint member 2, an inner joint member 3, eight torque transmitting balls 4, and a cage 5. A center of curvature O1 of a spherical outer surface 12 and a center of curvature O2 of a spherical inner surface 13 of the cage 5 each have an equal and axially opposite offset (f) with respect to a center O3 of pockets 5a. A ratio
(Continued)

$f/PCD_{BALL}$ between the offset (f) of the cage 5 and a pitch circle diameter ($PCD_{BALL}$) of the torque transmitting balls 4 is 0.07 or more and 0.09 or less.

16 Claims, 13 Drawing Sheets

(30) Foreign Application Priority Data

Apr. 24, 2018 (JP) ................................. 2018-082974
Apr. 24, 2018 (JP) ................................. 2018-082977

(58) Field of Classification Search
USPC ........................................................ 464/146
See application file for complete search history.

(56) References Cited

U.S. PATENT DOCUMENTS 7,431,653 B2* 10/2008 Mochinaga ............. F16D 3/227
464/146
9,926,985 B2* 3/2018 Kim ......................... F16D 3/22

FOREIGN PATENT DOCUMENTS

| JP | 2000-314430 | 11/2000 |
| JP | 2007-100797 | 4/2007 |
| JP | 2007-224995 | 9/2007 |
| JP | 2009-228813 | 10/2009 |
| JP | 2011-52625 | 3/2011 |

OTHER PUBLICATIONS

Notice of Reasons for Refusal dated Sep. 27, 2022 in corresponding Japanese Patent Application No. 2019-049764, with English language translation.
Decision of Refusal dated Mar. 31, 2023 in corresponding Japanese Patent Application No. 2018-082977, with English-language translation.
International Preliminary Report on Patentability and Written Opinion of the International Searching Authority dated Oct. 27, 2020 in International (PCT) Application No. PCT/JP2019/016030.

* cited by examiner

PLUNGING TYPE CONSTANT VELOCITY UNIVERSAL JOINT FOR PROPELLER SHAFT

TECHNICAL FIELD

The present invention relates to a plunging type constant velocity universal joint dedicated to propeller shafts.

BACKGROUND ART

Plunging type constant velocity universal joints capable of axial displacement and angular displacement are used for propeller shafts used in automobiles such as four-wheel drive vehicles (4WD vehicles) and front-engine, rear-wheel drive vehicles (FR vehicles). The plunging type constant velocity universal joints include a double-offset plunging type constant velocity universal joint (DOJ), a tripod plunging type constant velocity universal joint (TJ), a cross-groove plunging type constant velocity universal joint (LJ), etc.

In recent years, along with the improvement in fuel efficiency of automobiles, the propeller shafts are required to be smaller and lighter. Conventionally, from the viewpoint of component commonality, components (such as an outer joint member, an inner joint member, and a cage) used for plunging type constant velocity universal joints for drive shafts have been directly used for plunging type constant velocity universal joints for propeller shafts except for a modified shape of the attachment portion of the outer joint member.

The plunging type constant velocity universal joints used for propeller shafts include a double-offset plunging type constant velocity universal joint (hereinafter also referred to as DOJ). Patent Literature 1 below proposes a DOJ designed to have eight balls to achieve size reduction and weight reduction.

CITATIONS LIST

Patent Literature

Patent Literature 1: JP H10-73129 A

SUMMARY OF INVENTION

Technical Problems

The DOJ can slide a relatively large distance in the axial direction, has a good track record of use and stable performance, and further, can be designed to have eight balls to achieve size reduction and weight reduction. The present inventors have studied various existing DOJs used for propeller shafts in order to meet the demands for further improvement in fuel efficiency of automobiles and size reduction, weight reduction, and increase in rotation speed of propeller shafts.

It is an object of the present invention to provide a plunging type constant velocity universal joint dedicated to propeller shafts with a reduced size and weight, which can contribute to the demands for further improvement in fuel efficiency of automobiles and increase in rotation speed of propeller shafts.

Solutions to Problems

The present inventors have conducted various studies in order to achieve the above-mentioned objective and arrived at the present invention based on the following findings and ideas.

(1) An existing 8-ball type DOJ for propeller shafts as shown in FIGS. 11A, 11B, and 12 has a maximum operating angle of about 25° so that it can also be used for drive shafts. The present inventors have focused on the fact that the function of the DOJ can be limited by specializing the DOJ to required characteristics for use with propeller shafts. Specifically, it has been found that by making the DOJ dedicated to propeller shafts, the maximum operating angle can be limited to a low value (e.g., 15° or less), and size reduction and weight reduction of the DOJ can thereby be achieved.

(2) By limiting the maximum operating angle of the propeller shaft-dedicated DOJ to a low value, the following specific technical effects can be obtained.

(a) Radial size reduction and weight reduction by reducing the wall thickness of each component (outer joint member, inner joint member, cage)

(b) Axial size reduction and weight reduction of the inner joint member by reducing the amount of axial movement of the balls (c) Radial size reduction and weight reduction of the cage by reducing the amount of circumferential movement of the balls (d) Axial size reduction and weight reduction of the cage by reducing pocket load (3) In addition, the possibility of further size reduction and weight reduction has been studied by focusing on the dynamic factors that the DOJ for propeller shafts has a small and substantially constant operating angle and a high rotation speed. As a result, the idea to reduce the offset of the cage has been conceived, and it has been found that this dramatically enhances the technical effects of (2) mentioned above, and size reduction and weight reduction that are qualitatively different than in the conventional technique can be achieved.

(4) Further, in terms of performance, the idea of the combined use of an axial pocket clearance $\delta 1$ between a pocket of the cage and a ball and an axial clearance $\delta 2$ between spherical surfaces of the cage and the inner joint member has been conceived. And the advantageous arrangement of the present invention has been reached as a result verifying the effects of improvement in life, increase in rotation speed, reduction of sliding resistance, and vehicle vibration characteristics as a propeller shaft-dedicated DOJ.

As technical means for achieving the above-mentioned objective, the present invention is a plunging type constant velocity universal joint for a propeller shaft, including: an outer joint member having eight straight track grooves formed along an axial direction on a cylindrical inner surface; an inner joint member having eight straight track grooves formed along the axial direction on a spherical outer surface and opposing the straight track grooves of the outer joint member and a connecting hole in which female splines are formed; eight torque transmitting balls disposed between the straight track grooves of the outer joint member and the straight track grooves of the inner joint member; a cage having pockets accommodating the torque transmitting balls, a spherical outer surface guided in contact with the cylindrical inner surface of the outer joint member, and a spherical inner surface guided in contact with the spherical outer surface of the inner joint member, and is characterized in that a center of curvature of the spherical outer surface and a center of curvature of the spherical inner surface of the cage each have an equal and axially opposite offset (f) with respect to a center of the pockets, and a ratio $f/PCD_{BALL}$ between the offset (f) of the cage and a pitch circle diameter ($PCD_{BALL}$) of the torque transmitting balls is 0.07 or more and 0.09 or less.

With the above arrangement, it is possible to realize a plunging type constant velocity universal joint dedicated to propeller shafts that has a reduced size and weight, is qualitatively different from conventional one, and can contribute to the demands for further improvement in fuel efficiency of automobiles and increase in rotation speed of propeller shafts.

In the above plunging type constant velocity universal joint for the propeller shaft, it is desirable to provide an axial pocket clearance δ1 between axially opposing wall surfaces of the pockets of the cage and the torque transmitting balls and to provide an axial clearance δ2 between the spherical inner surface of the above cage and the spherical outer surface of the inner joint member. This suppresses temperature rise due to the sliding between the cage and the balls and the sliding between the cage and the inner joint member, which is effective for improvement in life and increase in rotation speed of the joint, as well as resulting in reduction of the sliding resistance. Further, the vibration from the engine can be absorbed by the above pocket clearance δ1 and axial clearance δ2, and thus the vibration characteristics of the vehicle can be improved. In particular, it is desirable to set the pocket clearance δ1 to 0 to 0.050 mm and the axial clearance δ2 to 0.5 to 1.5 mm.

By setting the maximum operating angle of the above plunging type constant velocity universal joint for the propeller shaft to 15° or less to specialize it to the required function for use with propeller shafts, the function of the plunging type constant velocity universal joint can be limited. And the size reduction and weight reduction of the plunging type constant velocity universal joint can be achieved.

By setting the ratio Ti/Db between the wall thickness Ti of the inner joint member and the ball diameter Db of the torque transmitting balls to 0.30 or more and 0.45 or less, radial size reduction and weight reduction can be achieved.

By setting the ratio Wi/Db between the width Wi of the inner joint member and the ball diameter Db of the torque transmitting balls to 1.2 or more and 1.4 or less, axial size reduction and weight reduction can be achieved.

By setting the ratio Wc/Db between the width Wc of the cage and the ball diameter Db of the torque transmitting balls to 1.8 or more and 2.0 or less, axial size reduction and weight reduction can be achieved.

Further, as technical means for achieving the above-mentioned objective, the present invention is a plunging type constant velocity universal joint for a propeller shaft including: an outer joint member having eight straight track grooves formed along an axial direction on a cylindrical inner surface; an inner joint member having eight straight track grooves formed along the axial direction on a spherical outer surface and opposing the straight track grooves of the outer joint member and a connecting hole in which female splines are formed; eight torque transmitting balls disposed between the straight track grooves of the outer joint member and the straight track grooves of the inner joint member; a cage having pockets accommodating the torque transmitting balls, a spherical outer surface guided in contact with the cylindrical inner surface of the outer joint member, and a spherical inner surface guided in contact with the spherical outer surface of the inner joint member, and is characterized in that a center of curvature of the spherical outer surface and a center of curvature of the spherical inner surface of the cage each have an equal and axially opposite offset (f) with respect to a center of the pockets, a ratio Ti/Db between a wall thickness Ti of the inner joint member and a ball diameter Db of the torque transmitting balls is 0.30 or more and 0.45 or less, and a ratio $PCD_{BALL}$/Db between a pitch circle diameter $PCD_{BALL}$ of the torque transmitting balls and the diameter Db of the torque transmitting balls is 3.3 or more and 3.6 or less.

In the case of a ball type constant velocity universal joint that transmits torque via balls, while each ball is evenly loaded when the operating angle is 0°, uneven loads are applied to the balls when an operating angle is taken, and the difference increases at a higher operating angle. Accordingly, the maximum load applied to one ball is also increased at a high operating angle. And the inner joint member, the outer joint member, and the cage, which contact the balls, are thus required to have a large wall thickness sufficient to withstand the load applied from the balls.

Thus, by making the DOJ dedicated to propeller shafts, it is possible to limit the maximum operating angle to a low value, so that the maximum load applied to one ball is reduced. Accordingly, the load applied to the inner joint member and the outer joint member from the balls is reduced, and it is thus possible to reduce their wall thickness and achieve the axial size reduction and weight reduction of the DOJ.

Further, by limiting the maximum operating angle of the DOJ to a low value, the amount of circumferential movement of the balls in the pockets of the cage is reduced, and it is thus possible to shorten the circumferential length of the pockets. This allows the cage to have a smaller diameter, and it is thus possible to reduce the pitch circle diameter $PCD_{BALL}$ of the balls and hence the outer diameter of the outer joint member, so that further radial size reduction and weight reduction of the DOJ can be achieved.

Further, by limiting the maximum operating angle of the DOJ to a low value, allowance can be made for the strength of the inner joint member. It is thus possible to increase the inner diameter of a connecting hole of the inner joint member into which the shaft is connected, that is, the pitch circle diameter of the female splines. This allows the shaft, which is the weakest component at a low operating angle, to have a larger diameter and thus an increased strength, so that the durability of the propeller shaft is improved.

In the DOJ, the center of curvature of the spherical outer surface of the cage and the center of curvature of the spherical inner surface of the cage are axially offset to maintain the balls on the bisector plane of the operating angle at any operating angle, so that the constant-speed torque transmission is achieved. Since the propeller shaft DOJ has a small and substantially constant operating angle, smooth torque transmission can be achieved even if the offset (f) between the center of curvature of the outer surface and the center of curvature of the inner surface of the cage is reduced. The present inventors have found that by reducing the offset (f) of the cage, it is possible to reduce the axial dimension and radial wall thickness of the cage without impairing the function and durability of the DOJ, and have thereby achieved further size and weight reduction of the DOJ. Further, by reducing the offset (f) of the cage, the force acting on the pockets of the cage and the inner surface of the outer joint member is reduced, so that the heat generation of the DOJ for propeller shafts, which is used at high rotation speed, can be suppressed.

Further, as technical means for achieving the above-mentioned objective, the present invention is a plunging type constant velocity universal joint for a propeller shaft including: an outer joint member having eight straight track grooves formed along an axial direction on a cylindrical inner surface; an inner joint member having eight straight track grooves formed along the axial direction on a spherical outer surface and opposing the straight track grooves of the outer joint member and a connecting hole in which female splines are formed; eight torque transmitting balls disposed between the straight track grooves of the outer joint member and the straight track grooves of the inner joint member; a cage having pockets accommodating the torque transmitting balls, a spherical outer surface guided in contact with the cylindrical inner surface of the outer joint member, and a spherical inner surface guided in contact with the spherical outer surface of the inner joint member, and is characterized in that a center of curvature of the spherical outer surface and a center of curvature of the spherical inner surface of the cage each have an equal and axially opposite offset (f) with respect to a center of the pockets, a ratio Wi/Db between an axial width Wi of the inner joint member and a ball diameter Db of the torque transmitting balls is 1.2 or more and 1.4 or less, and a ratio $PCD_{BALL}/Db$ between a pitch circle diameter $PCD_{BALL}$ of the torque transmitting balls and the diameter Db of the torque transmitting balls is 3.3 or more and 3.6 or less.

By making the DOJ dedicated to propeller shafts, it is possible to limit the maximum operating angle to a low value, so that the amount of axial movement of the balls relative to the inner joint member is reduced. Accordingly, it is possible to reduce the axial length of the track grooves of the inner joint member and hence the axial width Wi of the inner joint member, so that the axial size reduction and weight reduction of the DOJ can be achieved.

Further, by limiting the maximum operating angle of the DOJ to a low value, the amount of circumferential movement of the balls in the pockets of the cage is reduced, and it is thus possible to shorten the circumferential length of the pockets. This allows the cage to have a smaller diameter, and it is thus possible to reduce the pitch circle diameter $PCD_{BALL}$ of the balls, so that the radial size reduction and weight reduction of the DOJ can be achieved.

Further, by limiting the maximum operating angle of the DOJ to a low value, the load applied to the axially opposing wall surfaces of the pockets of the cage is reduced, and it is thus possible to reduce the axial widths of the portions of the cage to which axial load is applied from the balls (specifically, the annular portions provided on both axial sides of the pockets). In this manner, the axial width of the cage is reduced, and further axial size reduction and weight reduction of the DOJ can be achieved.

Further, as technical means for achieving the above-mentioned objective, the present invention is a plunging type constant velocity universal joint for a propeller shaft including: an outer joint member having eight straight track grooves formed along an axial direction on a cylindrical inner surface; an inner joint member having eight straight track grooves formed along the axial direction on a spherical outer surface and opposing the straight track grooves of the outer joint member and a connecting hole in which female splines are formed; eight torque transmitting balls disposed between the straight track grooves of the outer joint member and the straight track grooves of the inner joint member; a cage having pockets accommodating the torque transmitting balls, a spherical outer surface guided in contact with the cylindrical inner surface of the outer joint member, and a spherical inner surface guided in contact with the spherical outer surface of the inner joint member, and is characterized in that a center of curvature of the spherical outer surface and a center of curvature of the spherical inner surface of the cage each have an equal and axially opposite offset (f) with respect to a center of the pockets, a ratio To/Db between a wall thickness To of the outer joint member and a ball diameter Db of the torque transmitting balls is 0.25 or more and 0.29 or less, and a ratio $PCD_{BALL}/Db$ between a pitch circle diameter $PCD_{BALL}$ of the torque transmitting balls and the diameter Db of the torque transmitting balls is 3.3 or more and 3.6 or less.

In the case of a ball type constant velocity universal joint that transmits torque via balls, while each ball is evenly loaded when the operating angle is 0°, uneven loads are applied to the balls when an operating angle is taken, and the difference increases at a higher operating angle. Accordingly, the maximum load applied to one ball is also increased at a high operating angle, and the inner joint member, the outer joint member, and the cage, which contact the balls, are thus required to have a large wall thickness sufficient to withstand the load applied from the balls.

Thus, by making the DOJ dedicated to propeller shafts, it is possible to limit the maximum operating angle to a low value, so that the maximum load applied to one ball is reduced. Accordingly, the load applied to the inner joint member and the outer joint member from the balls is reduced, and it is thus possible to reduce their wall thickness and achieve the axial size reduction and weight reduction of the DOJ.

Further, by limiting the maximum operating angle of the DOJ to a low value, the amount of circumferential movement of the balls in the pockets of the cage is reduced, and it is thus possible to shorten the circumferential length of the pockets. This allows the cage to have a smaller diameter, and it is thus possible to reduce the pitch circle diameter $PCD_{BALL}$ of the balls and hence the outer diameter of the outer joint member, so that further radial size reduction and weight reduction of the DOJ can be achieved.

Further, by limiting the maximum operating angle of the DOJ to a low value, allowance can be made for the strength of the inner joint member. It is thus possible to increase the inner diameter of a connecting hole of the inner joint member into which the shaft is connected, that is, the pitch circle diameter of the female splines. This allows the shaft, which is the weakest component at a low operating angle, to have a larger diameter and thus an increased strength, so that the durability of the propeller shaft is improved.

Advantageous Effects of Invention

According to the present invention, it is possible to realize a plunging type constant velocity universal joint dedicated to propeller shafts that has a reduced size and weight, is qualitatively different from conventional one, and can contribute to the demands for further improvement in fuel efficiency of automobiles and increase in rotation speed of propeller shafts.

DESCRIPTION OF EMBODIMENTS

Embodiments of the present invention will be described with reference to the drawings.

First, an outline of the drive system of an example four-wheel drive vehicle (hereinafter also referred to as a 4WD vehicle) using a propeller shaft will be described with reference to FIGS. 13 and 14.

Figure 13:
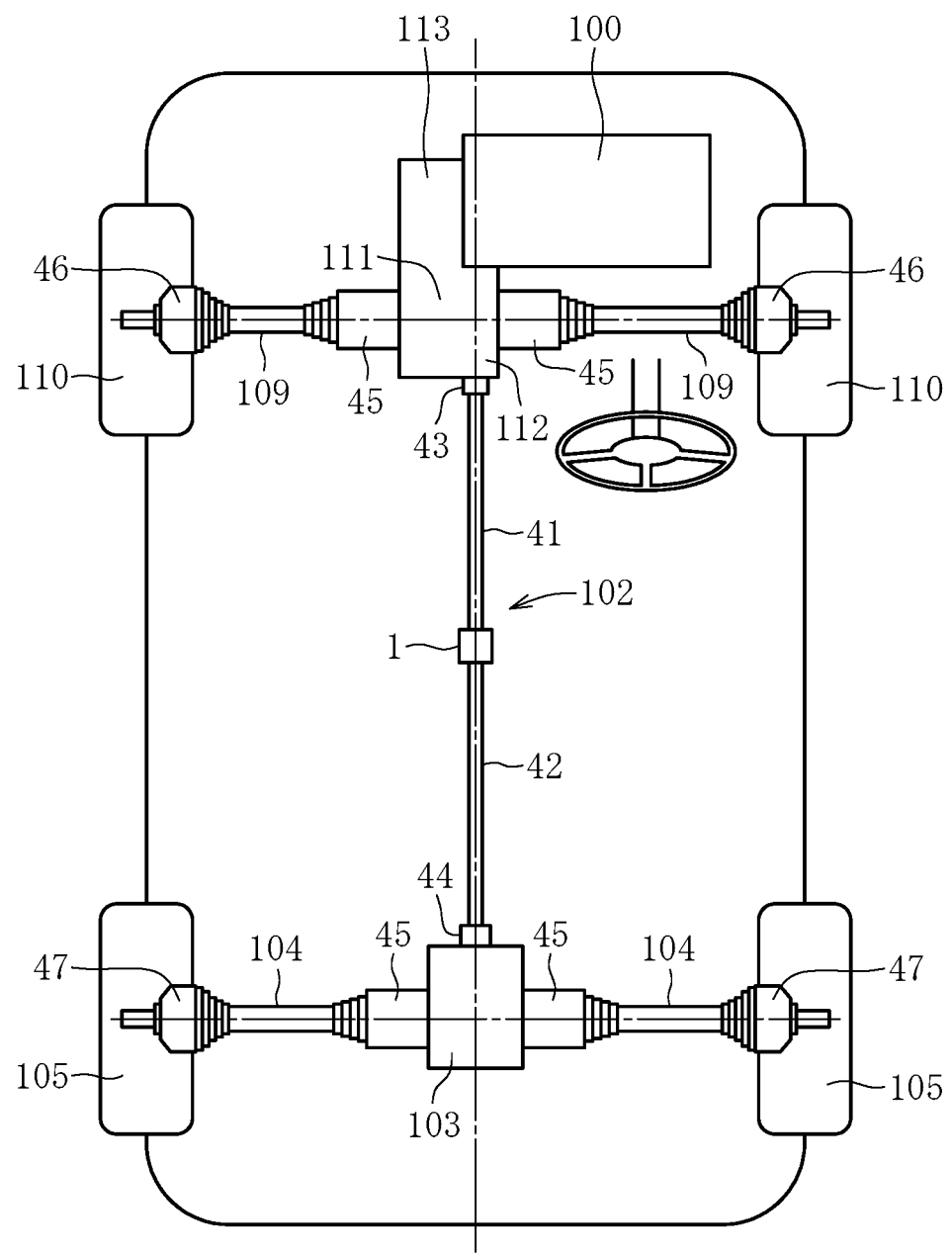
FIG. 13 is a plan view showing an outline of the drive system of an FF-based 4WD vehicle.

As shown in FIG. 13, in the drive system of an FF (front-engine, front-wheel drive)-based 4WD vehicle, the driving force is transmitted in the order of an engine 100, a transaxle 113, a differential 111, a transfer 112, a propeller shaft (rear propeller shaft) 102, a differential 103, drive shafts 104, and rear wheels 105. On the front side, the driving force is transmitted in the order of the engine 100, the transaxle 113, the differential 111, drive shafts 109, and front wheels 110.

Figure 14:
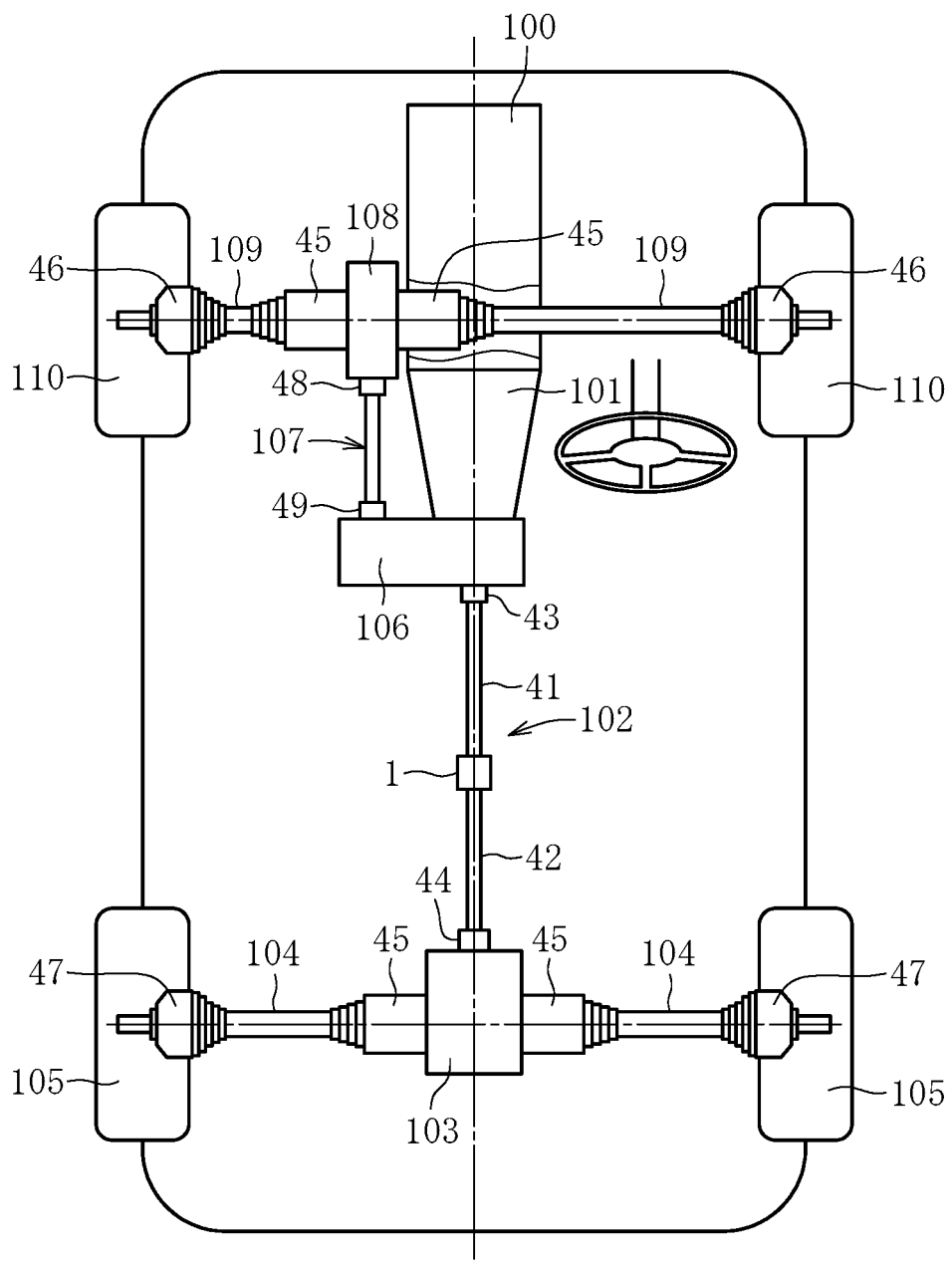
FIG. 14 is a plan view showing an outline of the drive system of an FR-based 4WD vehicle.

As shown in FIG. 14, in the drive system of an FR (front-engine, rear-wheel drive)-based 4WD vehicle, the driving force is transmitted in the order of an engine 100, a transmission 101, a propeller shaft (rear propeller shaft) 102, a differential 103, drive shafts 104, and rear wheels 105. Also, on the front side, the driving force is transmitted in the order of the engine 100, the transmission 101, a transfer 106, a propeller shaft (front propeller shaft) 107, a differential 108, drive shafts 109, and front wheels 110.

In both of the FF-based and FR-based 4WD vehicles, constant velocity universal joints 45, 46, and 47 used for the drive shafts 104 and 109 placed after the differentials 103, 108, and 111, which are final reduction gears, have a maximum rotational speed of about 2000 $min^{-1}$ and a normal maximum operating angle of about 15°. The operating angles of the constant velocity universal joints 45, 46, and 47 used for the drive shafts 104 and 109 are required to follow the vertical movement of the wheels 105 and 110, and constantly fluctuate. In addition, the fixed type constant velocity universal joints 46 attached to the front wheels 110 require large operating angles for steering. In the present embodiment, the fixed type constant velocity universal joints 46 attached to the front wheels 110 have a maximum operating angle of about 45°, and the other constant velocity universal joints 45 and 47 have a maximum operating angle of about 20 to 25°.

On the other hand, the propeller shafts 102 and 107 are arranged before the differentials 103, 108 and 111, which are final reduction gears, and are thus used at high rotation speed. Specifically, the maximum rotation speed is about 8000 $min^{-1}$. Since in the case of an independent suspension vehicle, the differentials 103, 108, and 111 are mounted on the vehicle body side, and the propeller shafts 102 and 107 have large total lengths, a constant velocity universal joint 1 used for the propeller shafts 102 and 107 has a small and substantially constant operating angle. Specifically, the constant velocity universal joint 1 has a normal maximum operating angle of 10° or less and a maximum operating angle of about 15°. Further, the transmission torque of the constant velocity universal joint 1 used for the propeller shafts 102 and 107 is much smaller than that of the constant velocity universal joints 45, 46, and 47 used for the drive shafts 104 and 109. Although FIGS. 13 and 14 illustrates an example in which universal joints 43, 44, 48, and 49 used for the propeller shafts 102 and 107 are cross joints, constant velocity universal joints may be used as at least one of these universal joints 43, 44, 48, and 49.

Figure 1:
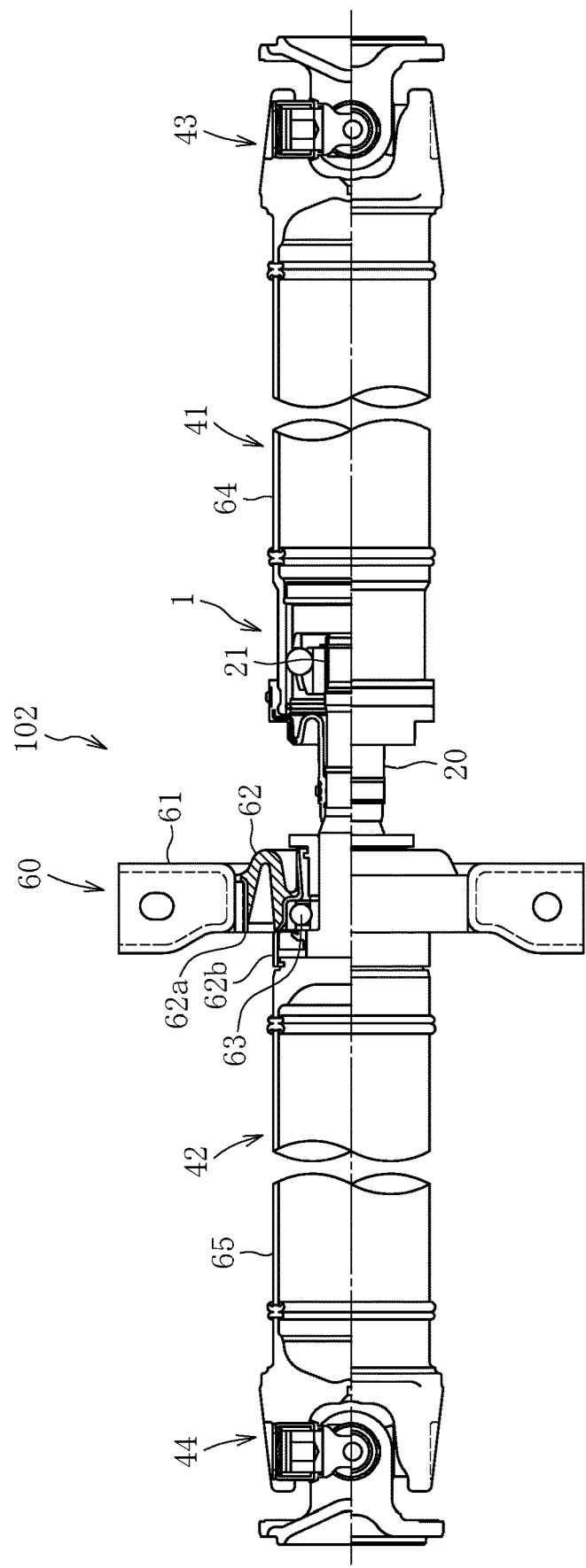
FIG. 1 is a diagram showing a propeller shaft equipped with a plunging type constant velocity universal joint for a propeller shaft according to an embodiment of the present invention.

Using the propeller shaft of the FF-based 4WD vehicle as an example, an outline of the propeller shaft will be described with reference to FIG. 1. The propeller shaft 102 is composed of a first propeller shaft 41 located on the front side (the right side in the figure, the engine 100 side in FIG. 13) and a second propeller shaft 42 located on the rear side (the left side in the figure, the differential 103 side in FIG. 13).

The first propeller shaft 41 has a main part composed of a hollow pipe 64 and one end (front end) connected to the output side (the transfer 112, see FIG. 13) of the engine 100 via the cross joint 43. The plunging type constant velocity universal joint 1 is connected to the other end (rear end) of the hollow pipe 64 of the first propeller shaft 41. The plunging type constant velocity universal joint 1 is the plunging type constant velocity universal joint for the propeller shaft according to the present embodiment.

The second propeller shaft 42 has a main part composed of a hollow pipe 65 and one end (front end) rotatably supported by a bearing support 60. Specifically, the bearing support 60 consists of a bracket 61, an elastic member 62, and a rolling bearing 63. An outer ring 62a of the elastic member 62 is fitted to the bracket 61, and an inner ring 62b of the elastic member 62 is fitted to the rolling bearing 63. A shaft 20 is provided at one end of the second propeller shaft 42, and the outer periphery of the shaft 20 is fitted to the rolling bearing 63 and elastically supported in the radial direction. One end (front end) of the shaft 20 is connected to a connecting hole of an inner joint member of the plunging type constant velocity universal joint 1. The other end (rear end) of the second propeller shaft 42 is connected to the differential 103 (see FIG. 13) via the cross joint 44. As described above, the first propeller shaft 41 and the second propeller shaft 42 are connected in the axial direction.

The overall arrangement of the plunging type constant velocity universal joint 1 for the propeller shaft according to the present embodiment will be described with reference to FIGS. 2A and 2B.

The plunging type constant velocity universal joint 1 for the propeller shaft (hereinafter also simply referred to as a plunging type constant velocity universal joint 1) according to the present embodiment is a so-called double-offset plunging type constant velocity universal joint (hereinafter also referred to as DOJ), and mainly includes an outer joint member 2, an inner joint member 3, torque transmitting balls 4, and a cage 5. Eight straight track grooves 7 are formed on a cylindrical inner surface 6 of the outer joint member 2 at equal intervals in the circumferential direction and along the axial direction. Eight straight track grooves 9 opposing the track grooves 7 of the outer joint member 2 are formed on a spherical outer surface 8 of the inner joint member 3 at equal intervals in the circumferential direction and along the axial direction. The torque transmitting balls (hereinafter also simply referred to as balls) 4 are individually disposed between the straight track grooves 7 of the outer joint member 2 and the straight track grooves 9 of the inner joint member 3. The balls 4 are accommodated in pockets 5a of the cage 5.

The cage 5 has a spherical outer surface 12 and a spherical inner surface 13, the spherical outer surface 12 is fitted to and guided in contact with the cylindrical inner surface 6 of the outer joint member 2, and the spherical inner surface 13 is fitted to and guided in contact with the spherical outer surface 8 of the inner joint member 3. The spherical outer surface 12 of the cage 5 has a center of curvature O1, and the spherical inner surface 13 has a center of curvature O2. The centers of curvature O1 and O2 have equal and axially opposite offsets f with respect to a center O3 of the pockets 5a of the cage 5. Here, the center O3 of the pockets 5a refers to the intersection point of the plane including the respective axial direction-centers of the eight pockets 5a and joint axis line N-N. In this manner, when the joint has an operating angle, the balls 4 are always guided on the plane that bisects the angle formed by the two axis lines of the outer joint member 2 and the inner joint member 3, and the rotational torque is transmitted between the two axes at the constant speed.

Figure 2A:
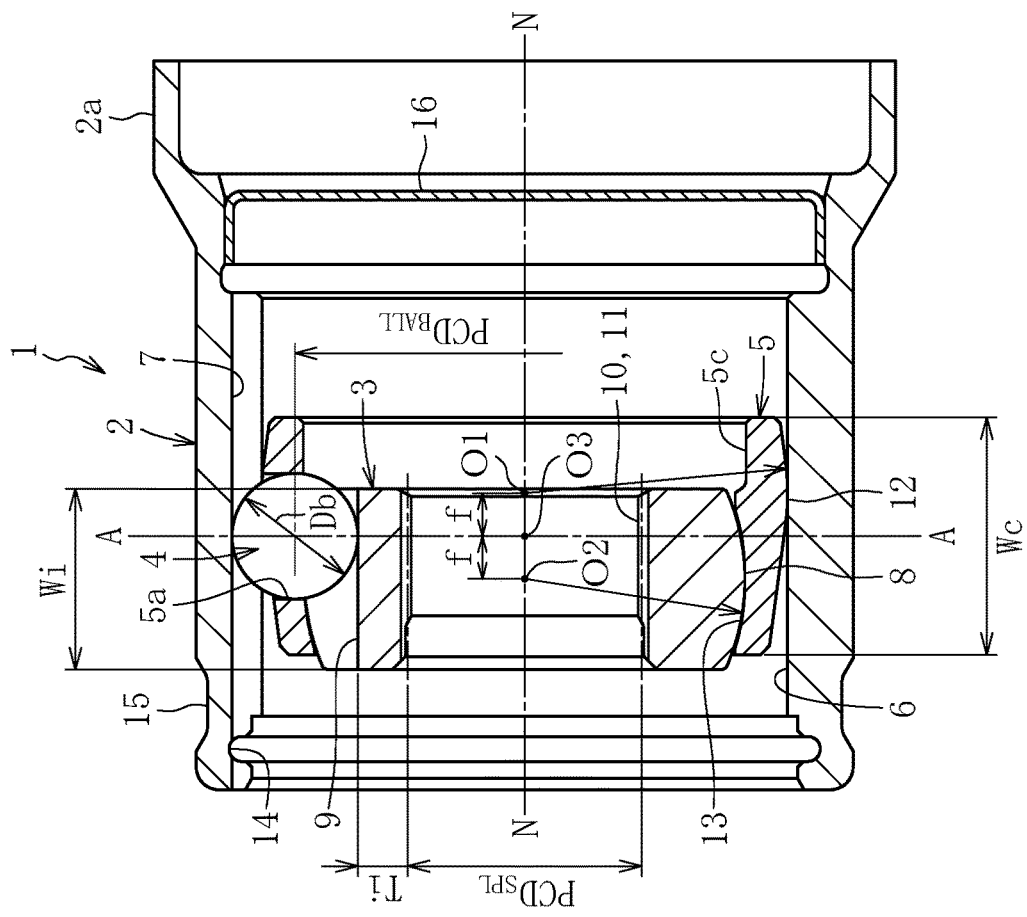
FIG. 2A is a longitudinal sectional view taken along line B-N-B in FIG. 2B, showing a plunging type constant velocity universal joint for a propeller shaft according to an embodiment of the present invention.
Figure 2B:
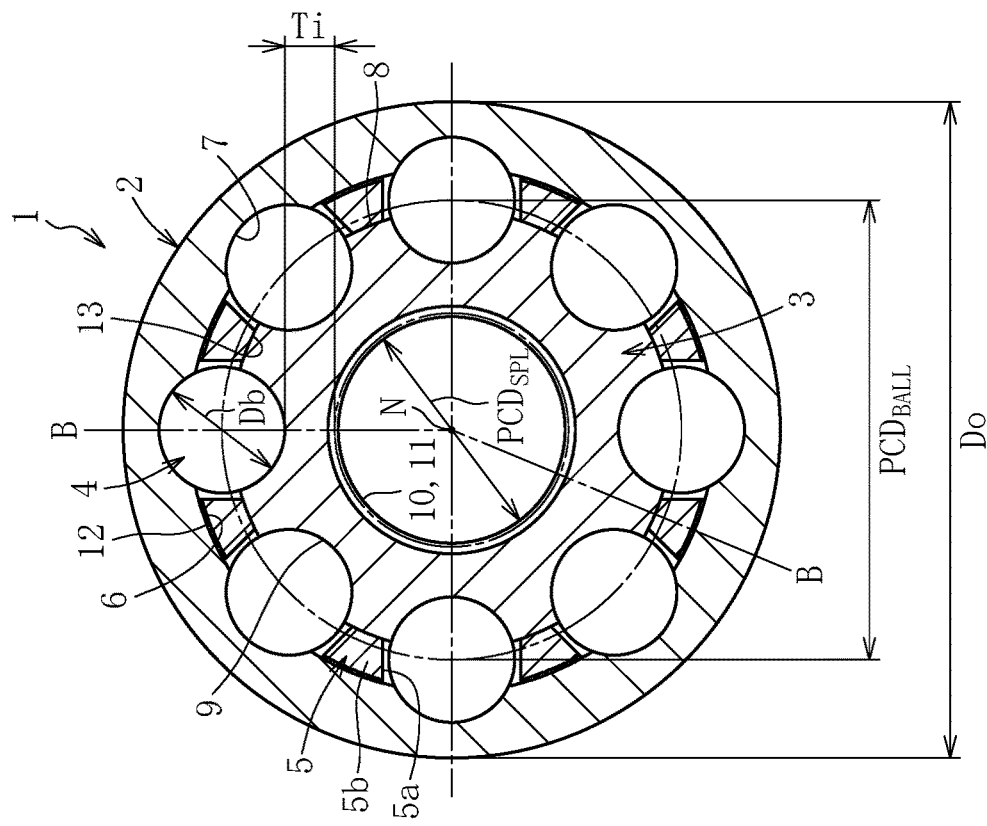
FIG. 2B is a cross sectional view taken along line A-A in FIG. 2A.

As shown in FIG. 2A, a large diameter portion 2a joined to the hollow pipe 64 of the first propeller shaft 41 is formed at one end (right end in FIG. 2A) of the outer joint member 2, and a seal cover 16 is attached to an inner hole near the large diameter portion 2a. Female splines (including serrations) 11 are formed in a connecting hole 10 passing through the axial center of the inner joint member 3, and male splines 21 of the shaft 20 (see FIGS. 1 and 8) are fitted and connected thereto and fixed in the axial direction by a retaining ring 22.

Figure 8:
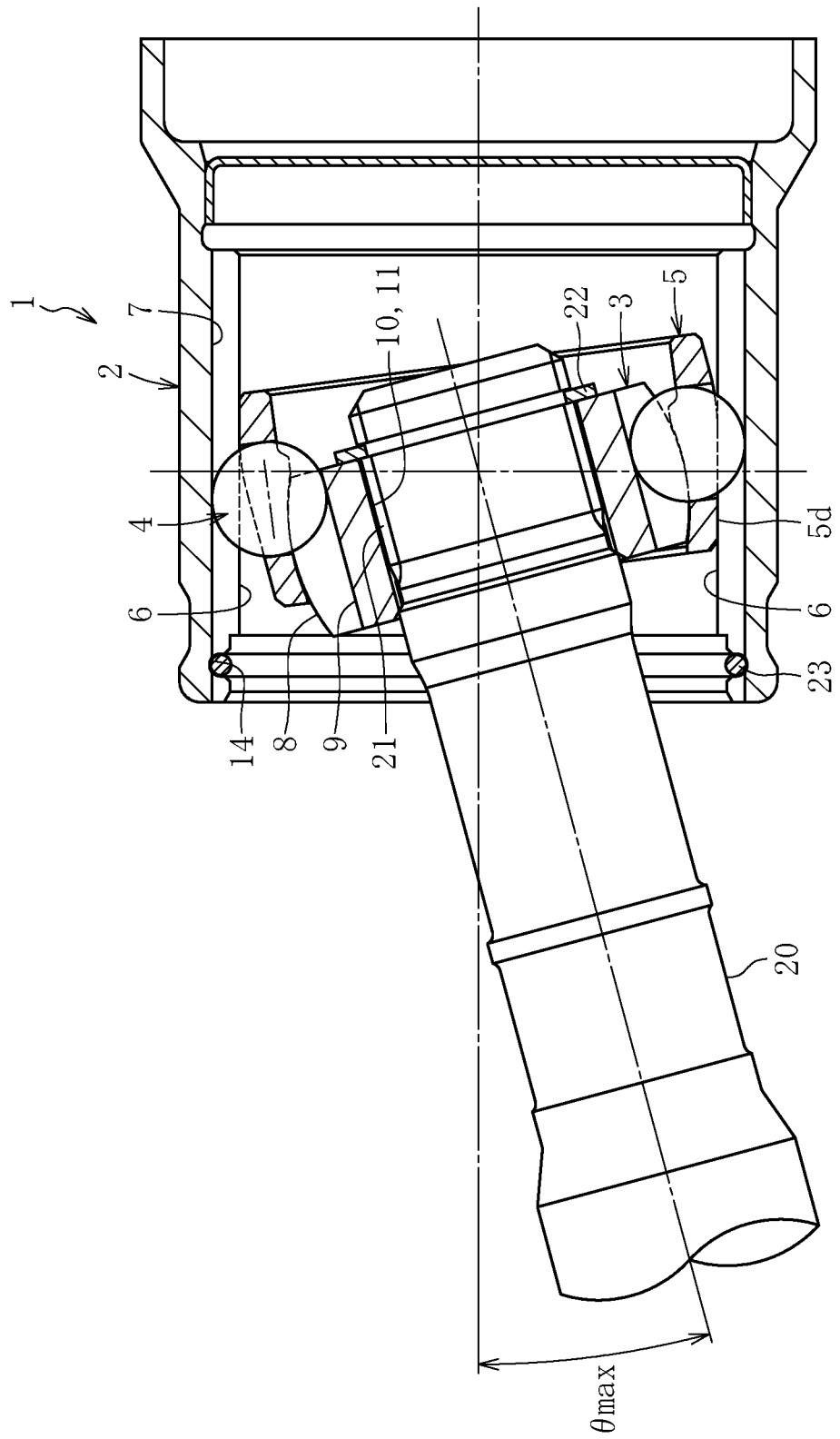
FIG. 8 is a longitudinal sectional view showing the maximum operating angle of the plunging type constant velocity universal joint of FIGS. 2A and 2B.
Figure 9:
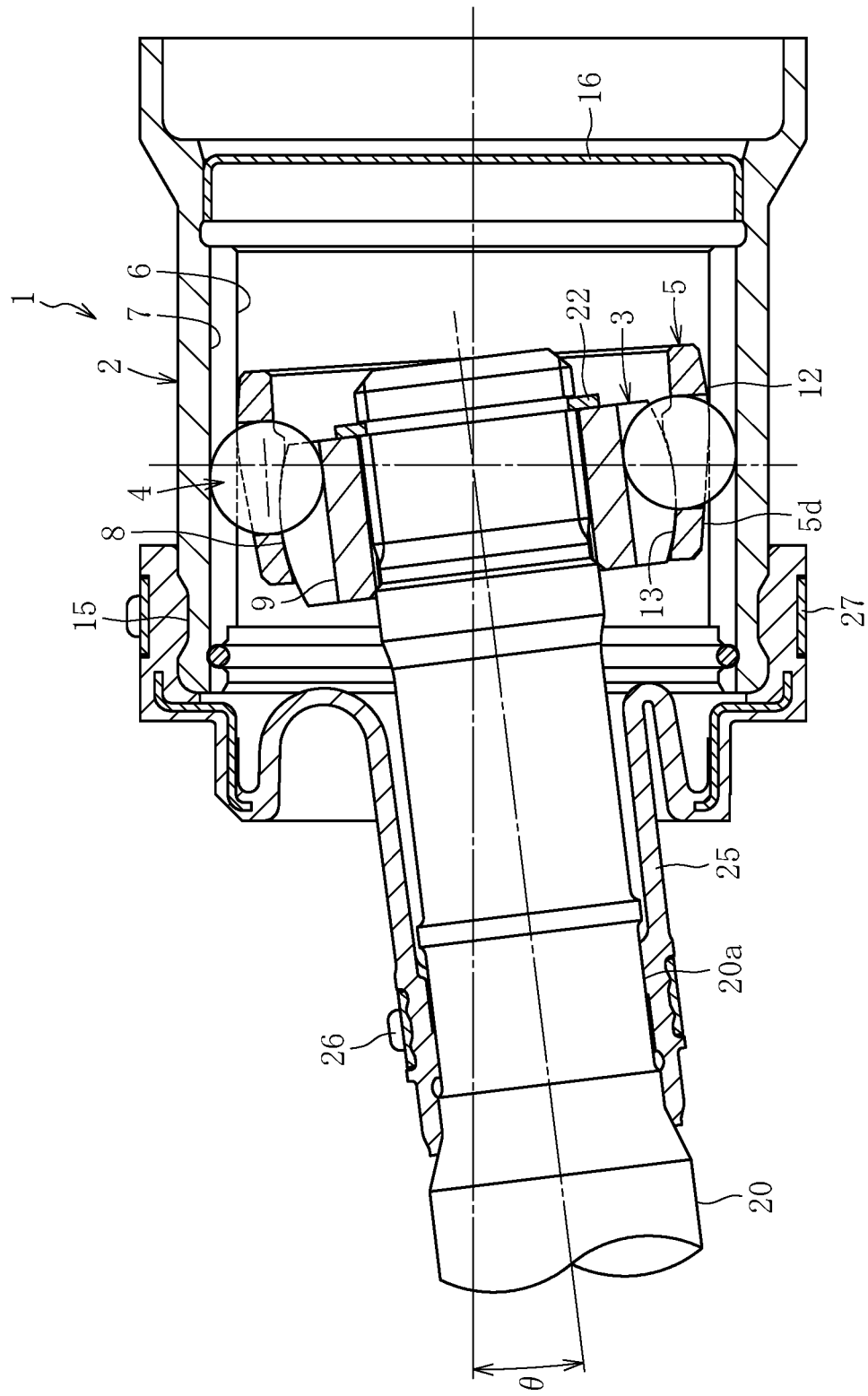
FIG. 9 is a longitudinal sectional view showing an operating angle that can be taken by the plunging type constant velocity universal joint of FIGS. 2A and 2B when equipped with a boot.

A retaining ring groove 14 is provided on the inner periphery of the other end (opening-side end) of the outer joint member 2. A retaining ring 23 (see FIG. 8) mounted in the retaining ring groove 14 prevents an inner assembly consisting of the inner joint member 3, the balls 4, and the cage 5 from coming out from the opening-side end of the outer joint member 2. A cylindrical surface-shaped notch 5c for disposing the inner joint member 3 is provided on the inner periphery of the large-diameter-side end (right end in FIG. 2A) of the cage 5. A boot mounting groove 15 is provided on the outer periphery of the opening-side end of the outer joint member 2. As shown in FIG. 9, a boot 25 is mounted in the boot mounting groove 15 of the outer joint member 2 and a boot mounting groove 20a of the shaft 20, and is tightened and fixed with boot bands 27 and 26. The boot 25 and the seal cover 16 function together to prevent the grease sealed inside the joint from leaking out and foreign matter from entering from outside the joint.

The overall structure of the plunging type constant velocity universal joint 1 of the present embodiment is as described above. Next, characteristic arrangements will be described. The findings and ideas in the development process leading to the characteristic arrangements of the plunging type constant velocity universal joint 1 of the present embodiment are as follows.

Figure 11A:
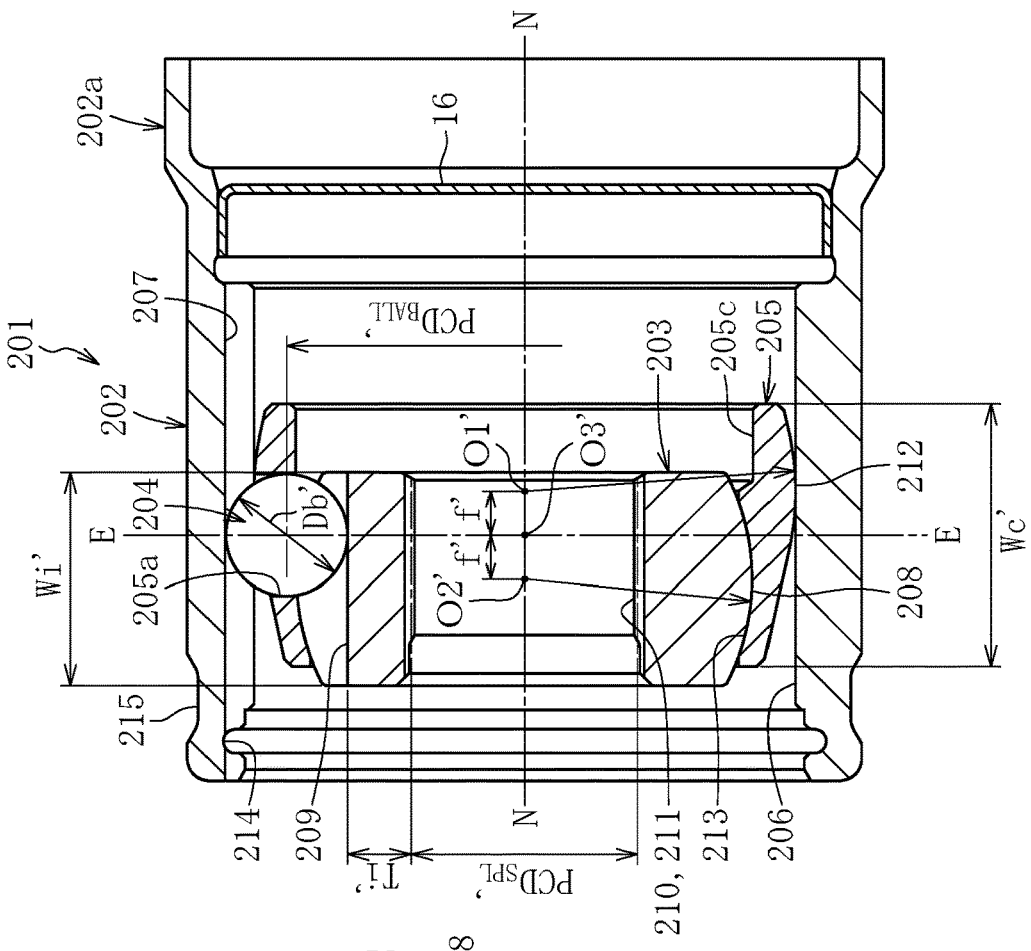
FIG. 11A is a longitudinal sectional view taken along line F-N-F in FIG. 11B, showing an existing plunging type constant velocity universal joint.
Figure 11B:
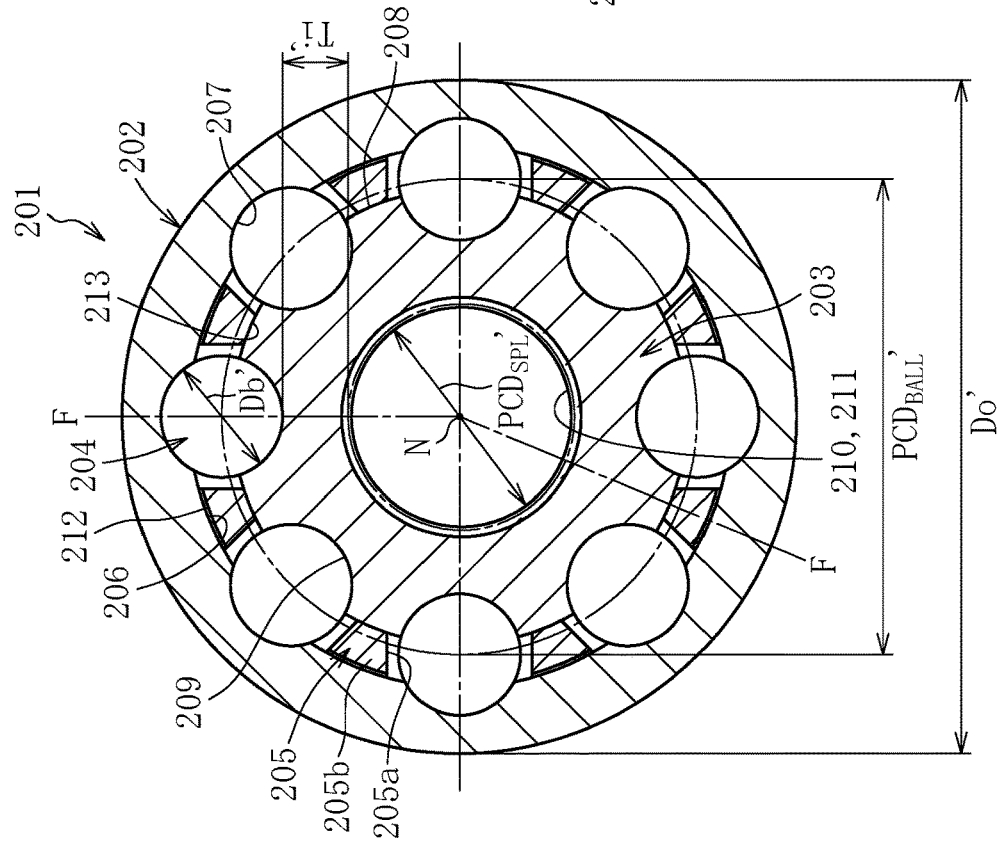
FIG. 11B is a cross sectional view taken along line E-E in FIG. 11A.
Figure 12:
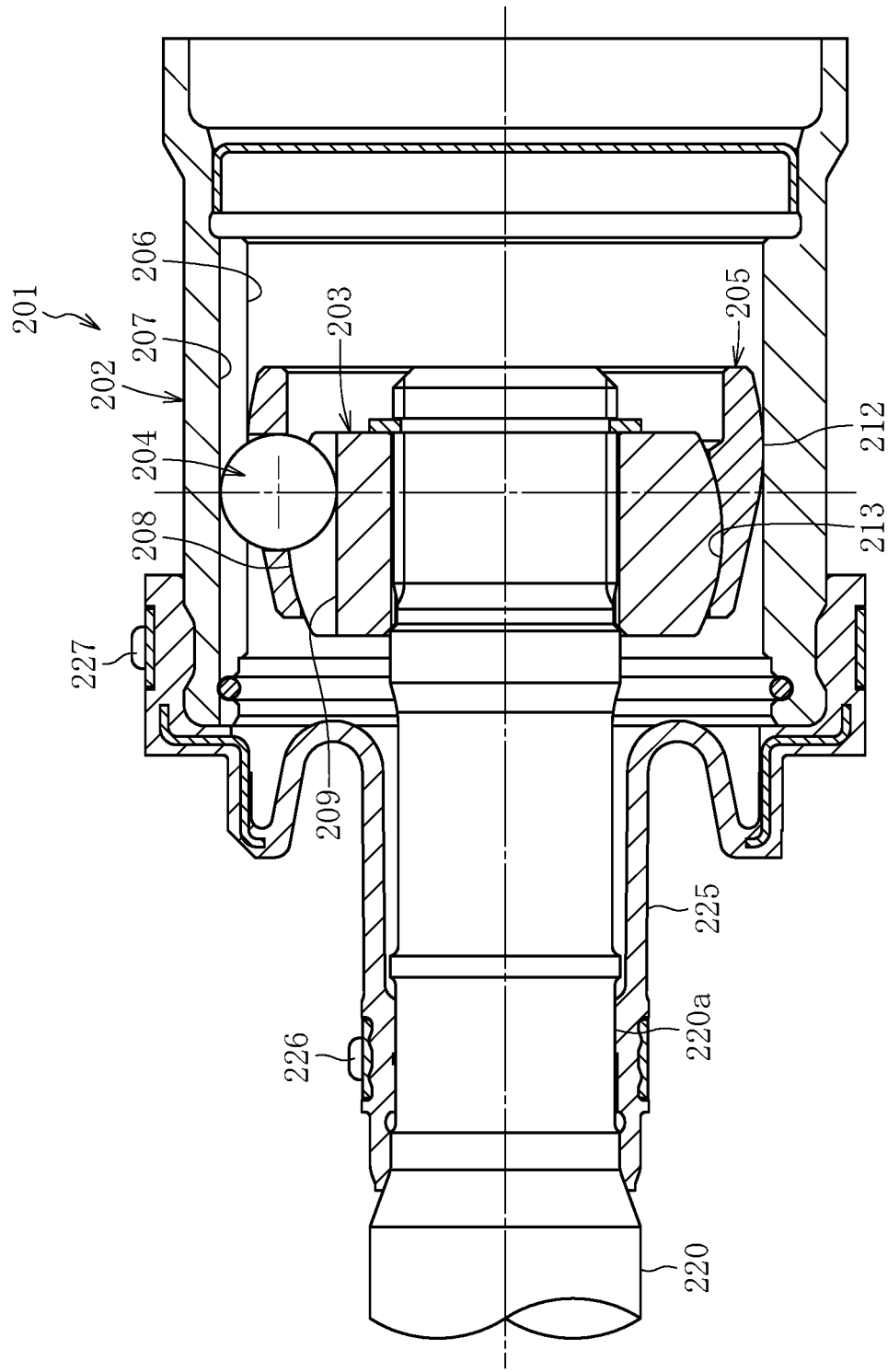
FIG. 12 is a longitudinal sectional view showing the plunging type constant velocity universal joint of FIG. 11 when assembled.

(1) The double-offset plunging type constant velocity universal joint (DOJ) can slide a relatively large distance in the axial direction, have a good track record of use and stable performance, and further, can be designed to have eight balls to achieve size reduction and weight reduction. Focusing on these points, various DOJs used for the existing propeller shafts as shown in FIGS. 11 and 12 have been studied in order to meet the demands for further improvement in fuel efficiency of automobiles and size reduction, weight reduction, and increase in rotation speed of propeller shafts. As a result, the focus has been put on the fact that although the existing DOJs have a maximum operating angle of about 25° so that they can also be used for drive shafts, the function of the DOJ can be limited by specializing it to required characteristics for use with propeller shafts. Specifically, it has been found that by making the DOJ dedicated to propeller shafts, the maximum operating angle can be limited to a low value (e.g., 15° or less), and size reduction and weight reduction of the DOJ can thereby be achieved.

(2) By limiting the maximum operating angle of the propeller shaft-dedicated DOJ to a low value, the following specific technical effects can be obtained.

(a) Radial size reduction and weight reduction by reducing the radial wall thickness of each component (outer joint member, inner joint member, cage)

(b) Axial size reduction and weight reduction of the inner joint member by reducing the amount of axial movement of the balls (c) Radial size reduction and weight reduction of the cage by reducing the amount of circumferential movement of the balls (d) Axial size reduction and weight reduction of the cage by reducing pocket load (3) In addition, the possibility of further size reduction and weight reduction has been studied by focusing on the dynamic factors that the DOJ for propeller shafts has a small and substantially constant operating angle and a high rotation speed. As a result, the idea to reduce the offset of the cage has been conceived, and it has been found that this enhances the technical effects of (2) mentioned above, and further size reduction and weight reduction of the DOJ can be achieved.

The above characteristic arrangements will be described in comparison with an existing plunging type constant velocity universal joint shown in FIGS. 11 and 12. As shown in FIGS. 11 and 12, an existing plunging type constant velocity universal joint 201 is a double-offset plunging type constant velocity universal joint using eight torque transmitting balls 204, mainly includes an outer joint member 202, an inner joint member 203, the torque transmitting balls 204, and a cage 205, and has a maximum operating angle of about 25°. A diameter Db of the torque transmitting balls 4 of the plunging type constant velocity universal joint 1 according to the present embodiment is equal to a diameter Db' of the torque transmitting balls 204 of the existing plunging type constant velocity universal joint 201. The basic internal arrangement is the same as that of the plunging type constant velocity universal joint 1 for the propeller shaft of the present embodiment, and portions having the same functions as those of the plunging type constant velocity universal joint 1 for the propeller shaft of the present embodiment are provided with reference numerals obtained by adding 200 to the reference numerals given in the present embodiment, and the center of the pockets, the centers of curvature, the offsets, and the like are provided with the alphabet reference characters obtained by adding a prime (') to the characters of the present embodiment.

Figure 3B:
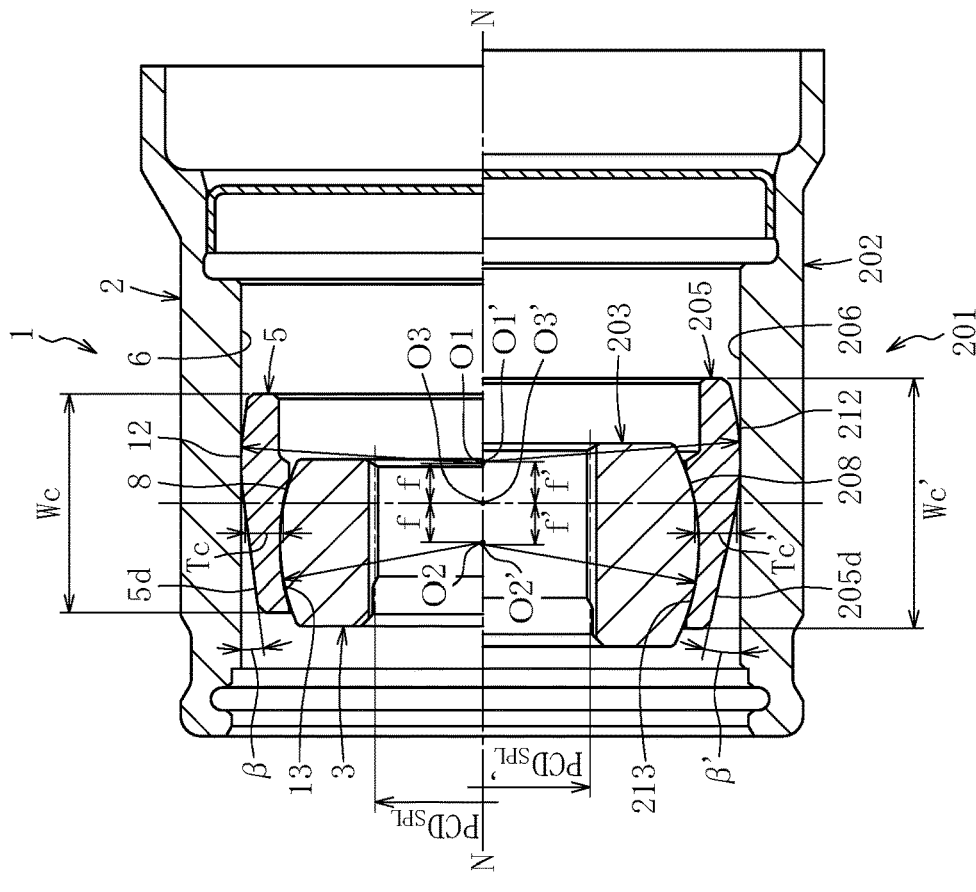
FIG. 3B is a diagram showing on the upper side a longitudinal section of the lower half of the plunging type constant velocity universal joint of FIG. 2A with respect to axis line N-N in a reversed orientation, and on the lower side a longitudinal section of the lower half of the plunging type constant velocity universal joint of FIG. 11A with respect to axis line N-N.
Figure 3A:
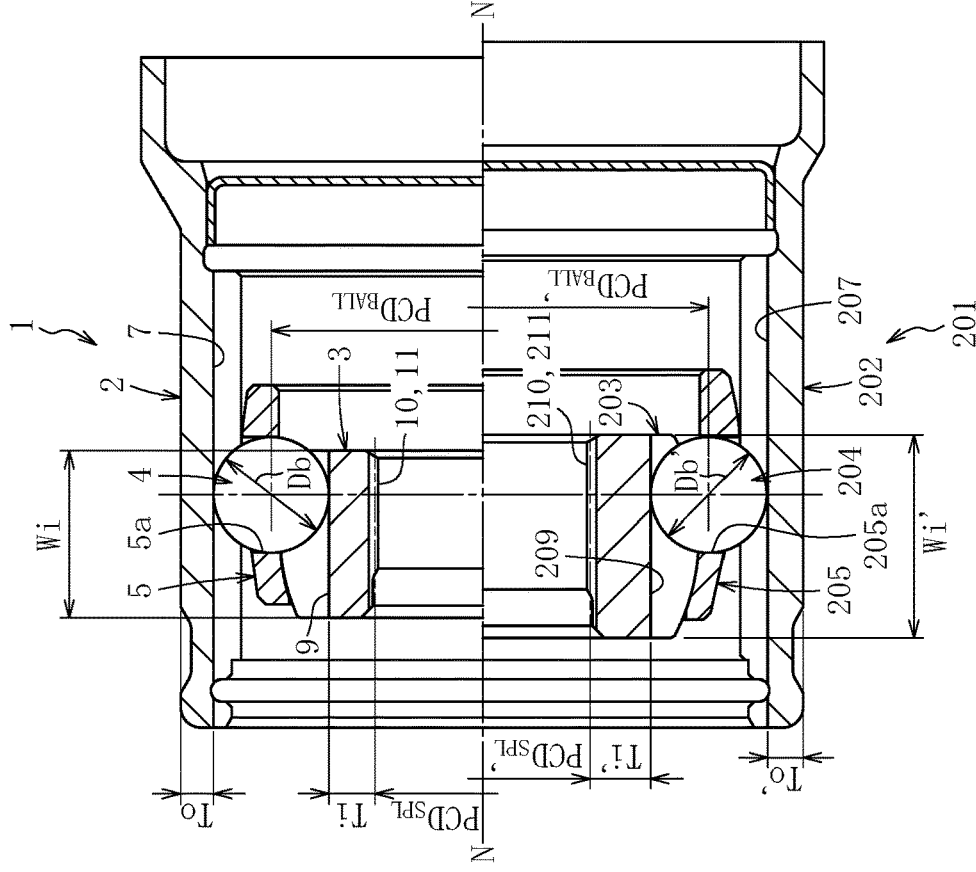
FIG. 3A is a diagram showing on the upper side a longitudinal section of the upper half of the plunging type constant velocity universal joint of FIG. 2A with respect to axis line N-N, and on the lower side a longitudinal section of the upper half of the plunging type constant velocity universal joint of FIG. 11A with respect to axis line N-N in a reversed orientation.

The respective longitudinal sections of the plunging type constant velocity universal joint 1 according to the present embodiment and the existing plunging type constant velocity universal joint 201 will be described in comparison with reference to FIGS. 3A and 3B. FIG. 3A is a diagram showing on the upper side a longitudinal section of the upper half of FIG. 2A with respect to axis line N-N, and on the lower side a longitudinal section of the upper half of FIG. 11A with respect to axis line N-N in a reversed orientation. FIG. 3B is a diagram showing on the upper side a longitudinal section of the lower half of FIG. 2A with respect to axis line N-N in a reversed orientation, and on the lower side a longitudinal section of the lower half of FIG. 11A with respect to axis line N-N.

The maximum operating angle of the plunging type constant velocity universal joint 1 of the present embodiment shown on the upper side of joint axis line N-N in FIG. 3B is set to 15°. Accordingly, an inclination angle β of a conical stopper surface 5d of the outer periphery of the cage 5 is formed at 7.5°, which is ½ of the maximum operating angle of 15°. Therefore, as shown in FIG. 8, the plunging type constant velocity universal joint 1 can take the maximum operating angle θmax=15° before the boot is mounted. However, the maximum operating angle may be set to an appropriate angle of 15° or less. Thus, when an operating angle is taken, the cylindrical inner surface 6 of the outer joint member 2 and the conical stopper surface 5d of the outer periphery of the cage 5 abut, so that the maximum operating angle is limited. In this specification, the maximum operating angle has the above meaning. In the completed state in which the boot is attached to the plunging type constant velocity universal joint 1, as shown in FIG. 9, when an operating angle is taken, the available operating angle is limited due to the abutment of the boot 25 and the shaft 20, and becomes smaller than the above maximum operating angle.

In contrast to the above, the maximum operating angle of the existing plunging type constant velocity universal joint 201 shown on the lower side of joint axis line N-N in FIG. 3B is set to about 25° so that it can be used for drive shafts, and an inclination angle β' of a conical stopper surface 205d of the outer surface of the cage 205 is formed at 12.5°, which is ½ of the maximum operating angle of 25°.

In the case of a ball type constant velocity universal joint, while each ball is evenly loaded when the operating angle is 0°, uneven loads are applied to the balls when an operating angle is taken, and the difference increases at a higher operating angle. Accordingly, the maximum load applied to one ball is also increased at a high operating angle, and the inner joint member, the outer joint member, and the cage, which contact the balls, are thus required to have a large wall thickness sufficient to withstand the maximum load applied from the balls. In contrast, with the plunging type constant velocity universal joint 1 of the present embodiment, by limiting the maximum operating angle to a low value, the required strength of the components of the outer joint member 2, the inner joint member 3, and the cage 5 can be reduced, and it is thus possible to reduce their wall thickness. Further, by limiting the maximum operating angle to a low value, the amount of radial movement of the balls 4 in the pockets 5a of the cage 5 at the maximum operating angle is also reduced, and it is thus possible to reduce the wall thickness of the cage 5.

Specifically, as shown in FIGS. 3A and 3B, a wall thickness To of the outer joint member 2 (specifically, the radial distance between the groove bottom of the track grooves 7 and the outer surface of the outer joint member 2) and a wall thickness Ti of the inner joint member 3 (specifically, the radial distance between the groove bottom of the track grooves 9 and the pitch circle of the female splines 11 of the inner joint member 3) of the plunging type constant velocity universal joint 1 in the present embodiment are thinner than a wall thickness To' of the outer joint member 202 and a wall thickness Ti' of the inner joint member 203 of the existing plunging type constant velocity universal joint 201, respectively. As an optimum value, the ratio Ti/Db between the wall thickness Ti of the inner joint member 3 and the ball diameter Db is 0.30 to 0.45. Also, the ratio To/Db between the wall thickness To of the outer joint member 2 and the ball diameter Db is 0.25 to 0.29.

In the case of a ball type constant velocity universal joint, the amount of circumferential movement of the balls relative to the cage increases at a higher operating angle. In the existing 8-ball-based plunging type constant velocity universal joint 201, since the maximum operating angle is set to about 25°, the amount of circumferential movement of the balls 204 relative to the cage 205 is large, and the circumferential length of the pockets 205a of the cage 205 accommodating the balls 204 needs to be increased. Further, in order to obtain a sufficient strength of a pillar portion 205b (see FIG. 11B) of the cage 205, there is a limit to the reduction of the circumferential dimension of the pillar portion 205b. As a result, the outer diameter of the cage 205 is increased, and it has not been possible to achieve sufficient size reduction of the plunging type constant velocity universal joint 201. Accordingly, the wall thickness Ti' of the inner joint member 203 has been unnecessarily large.

In contrast, by limiting the maximum operating angle of the plunging type constant velocity universal joint 1 to a low value as described above, the amount of circumferential movement of the balls 4 in the pockets 5a of the cage 5 is reduced, and it is thus possible to shorten the circumferential length of the pocket 5a, which enables the reduction of the diameter of the cage 5 and hence the radial size reduction of the plunging type constant velocity universal joint 1. Further, by reducing the diameter of the cage 5, it is possible to optimize the wall thickness of the inner joint member 3 and reduce the pitch circle diameter $PCD_{BALL}$ of the balls 4. Accordingly, an outer diameter Do of the outer joint member 2 can be reduced. As an optimum value, the ratio $PCD_{BALL}$/Db between the pitch circle diameter $PCD_{BALL}$ of the ball 4 and the diameter Db of the balls 4 is 3.3 or more and 3.6 or less.

Figure 10:
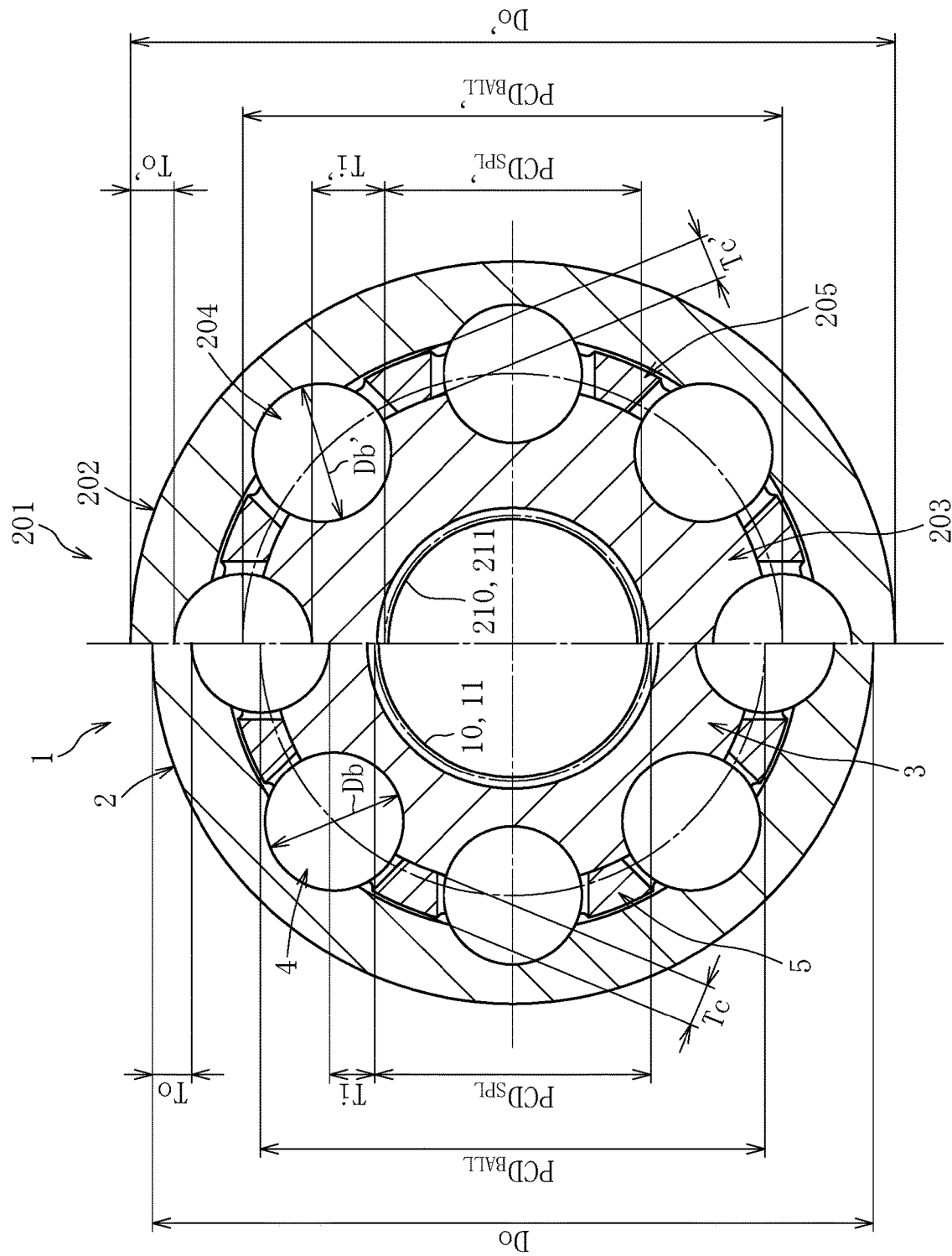
FIG. 10 is a diagram comparing the cross section of the plunging type constant velocity universal joint in FIG. 2B and the cross section of the plunging type constant velocity universal joint in FIG. 11B.

FIG. 10 shows in comparison the respective cross sections of the plunging type constant velocity universal joint 1 of the present embodiment and the existing plunging type constant velocity universal joint 201. The plunging type constant velocity universal joint 1 of the present embodiment has achieved a size reduction of 5% or more in the outer diameter Do of the outer joint member 2 over the existing plunging type constant velocity universal joint 201. The optimum value of the ratio Do/Db between the outer diameter Do of the outer joint member 2 and the diameter Db of the balls 4 is 2.7 or more and 3.0 or less.

Further, by limiting the maximum operating angle of the plunging type constant velocity universal joint 1 to a low value as described above, allowance can be made for the strength of the inner joint member 3, and it is possible to increase the strength of the shaft 20, which is the weakest part at a low operating angle. That is, it is possible to increase the pitch circle diameter ($PCD_{SPL}$) of the female splines 11 of the inner joint member 3, and as a result, the strength of the propeller shaft at a low operating angle can be improved. As an optimum value, the ratio $PCD_{SPL}$/Db between the pitch circle diameter $PCD_{SPL}$ of the female splines 11 and the diameter Db of the balls 4 is 1.75 or more and 1.85 or less. However, it is also possible to maintain the pitch circle diameter ($PCD_{SPL}$) of the female splines 11 as it currently is to facilitate the radial size reduction of the inner joint member 3.

Further, by limiting the maximum operating angle of the plunging type constant velocity universal joint 1 to a low value as described above, it is possible to reduce the axial widths of the inner joint member 3 and the cage 5, so that the weight and axial size reduction of the plunging type constant velocity universal joint 1 can be achieved. As shown in FIGS. 3A and 3B, an axial width Wi of the inner joint member 3 and an axial width Wc of the cage 5 of the plunging type constant velocity universal joint 1 are significantly reduced as compared to an axial width Wi' of the inner joint member 203 and an axial width Wc' of the cage 205 of the existing plunging type constant velocity universal joint 201.

Figure 4:
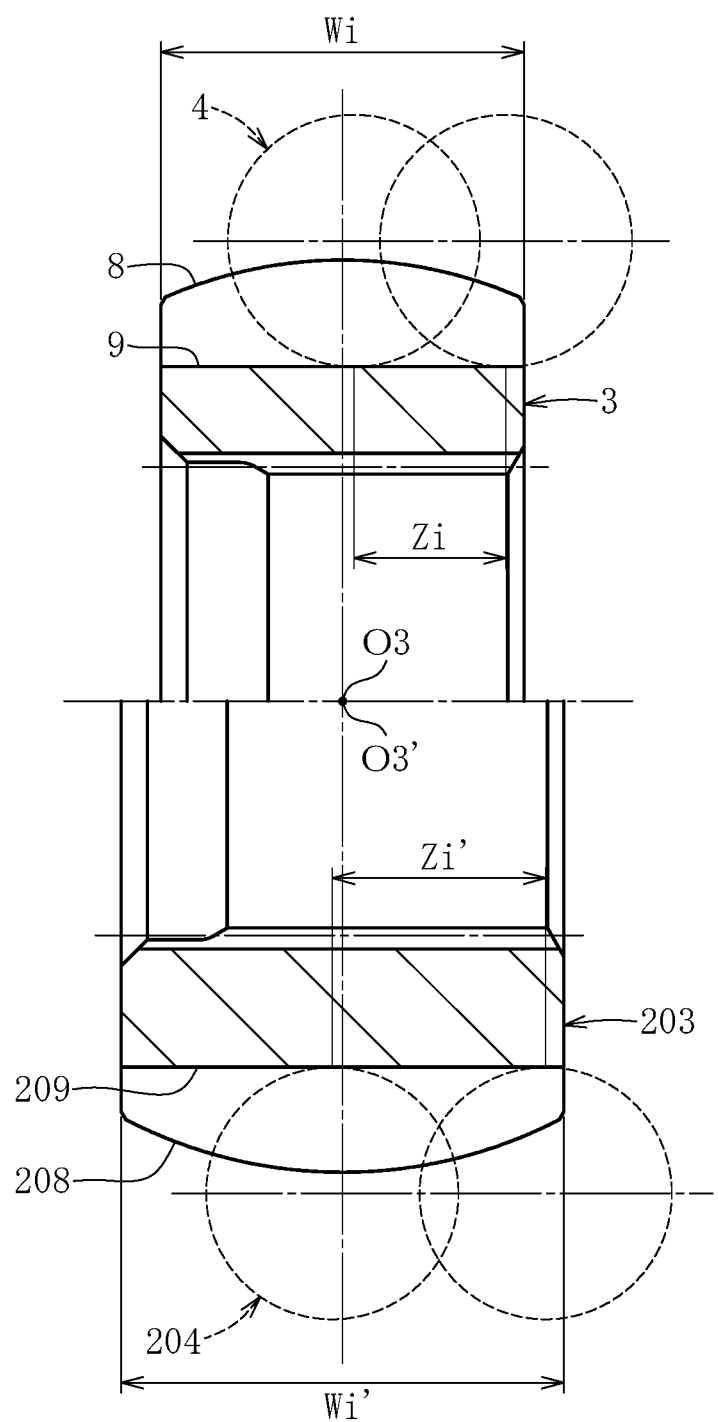
FIG. 4 is a sectional view of the plunging type constant velocity universal joint of FIG. 2A (upper half) and the plunging type constant velocity universal joint of FIG. 11A (lower half), comparing them with regard to the axial movement of an inner joint member and a ball.

In the above plunging type constant velocity universal joint 1, since the amount of axial movement of the ball 4 is determined by the maximum operating angle, the axial width Wi of the inner joint member 3 may be set accordingly. The relationship between the amount of axial movement of the balls 4 and the axial width Wi of the inner joint member 3 will be specifically described with reference to FIG. 4. FIG. 4 is a diagram comparing the plunging type constant velocity universal joint 1 according to the present embodiment and the existing plunging type constant velocity universal joint 201 used for propeller shafts with regard to the axial movement between the inner joint member and the balls. The amount of axial movement of the ball 4 of the plunging type constant velocity universal joint 1 is Zi, and the amount of axial movement of the ball 204 of the existing plunging type constant velocity universal joint 201 is Zi'. The amount of axial movement Zi is shorter than the amount of axial movement Zi' because of the lower maximum operating angle. Since the axial width Wi of the inner joint member 3 and the axial width Wi' of the inner joint member 203 are set in accordance with the respective amounts of axial movement Zi and Zi', the axial width Wi of the inner joint member 3 of the plunging type constant velocity universal joint 1 is significantly reduced as compared to the axial width Wi' of the inner joint member 203 of the existing plunging type constant velocity universal joint 201.

If the axial width Wi of the inner joint member 3 is too short, the spline fitting length between the female splines 11 of the inner joint member 3 and the male splines 21 of the shaft 20 becomes insufficient, and lack of joint strength between the inner joint member 3 and the shaft 20 occurs. However, by limiting the maximum operating angle of the plunging type constant velocity universal joint 1 to a low value as described above, allowance can be made for the strength of the inner joint member 3, so that it is possible to set the pitch circle diameter ($PCD_{SPL}$) of the female splines 11 to be larger than usual. This has advantageous effects on the torsional strength of the shaft 20, which is the weakest component at a low operating angle, and on the spline tooth surface pressure, and it is thus possible to shorten the spline fitting length, so that the axial width Wi of the inner joint member can be shortened to achieve weight reduction. As an optimum value, the ratio Wi/Db between the axial width Wi of the inner joint member 3 and the ball diameter Db is 1.2 to 1.4.

By limiting the maximum operating angle of the plunging type constant velocity universal joint 1 as described above, the ball load applied to the pockets 5a of the cage 5 is reduced. This can reduce the axial wall thickness between the axially opposing wall surfaces of the pockets 5a and the end surfaces of the cage 5 (that is, the axial wall thickness of the annular portions provided on both axial sides of the pockets 5a), leading to weight reduction. Specifically, as shown in FIG. 3B, the axial width Wc of the cage 5 of the plunging type constant velocity universal joint 1 is significantly reduced as compared to the axial width Wc' of the cage 205 of the existing plunging type constant velocity universal joint 201. As an optimum value, the ratio Wc/Db between the axial width Wc of the cage 5 and the ball diameter Db is 1.8 to 2.0.

The reduction of the offset of the cage, which dramatically enhances the technical effects of the weight reduction and size reduction of the plunging type constant velocity universal joint 1 of the present embodiment described above, will be described with reference to FIG. 3B. In the process of development, the possibility of size and weight reduction has been drastically studied by focusing on the dynamic factors that the plunging type constant velocity universal joint 1 for the propeller shaft has a small maximum operating angle, a substantially constant angle, and a high rotation speed. As a result, the idea that it is possible to reduce the offset f of the cage 5 has been conceived, and it has been found that this dramatically enhances the above-described technical effects so that further size reduction and weight reduction of the plunging type constant velocity universal joint 1 can be achieved.

As shown in FIG. 3B, the offset f of the cage 5 of the plunging type constant velocity universal joint 1 is set to be smaller than an offset f' of the cage 205 of the existing plunging type constant velocity universal joint 201. In the plunging type constant velocity universal joint 1, as a dedicated design for use with propeller shafts, the ratio f/PCD$_{BALL}$ between the offset f of the cage 5 and the pitch circle diameter PCD$_{BALL}$ of the balls 4 (see FIG. 3A) is set to be 0.07 or more and 0.09 or less. By reducing the offset of the cage 5 in this manner, further size reduction and weight reduction of the plunging type constant velocity universal joint 1 can be achieved. Further, by reducing the offset f of the cage 5, the force acting on the pockets 5a of the cage 5 and the inner surface 6 of the outer joint member 2 is reduced, so that the heat generation of the plunging type constant velocity universal joint 1 for the propeller shaft, which is used at high rotation speed, can be suppressed. The ratio f'/PCD$_{BALL}$' between the offset f' of the cage 205 of the existing plunging type constant velocity universal joint 201 and the pitch circle diameter PCD$_{BALL}$' of the balls 204 (see FIG. 3A) is set to a value more than 0.09.

Table 1 shows dimensional ratios of the plunging type constant velocity universal joint 1 of the present embodiment and the existing plunging type constant velocity universal joint 201.

TABLE 1

|  | Invented Product | Existing Product |
|---|---|---|
| Cage offset f/ball PCD (PCD$_{BALL}$) | 0.07-0.09 | more than 0.09 |
| Inner joint member wall thickness Ti/ball diameter Db | 0.30-0.45 | more than 0.45 |
| Outer joint member wall thickness To/ball diameter Db | 0.25-0.29 | more than 0.29 |
| Inner joint member width Wi/ball diameter Db | 1.2-1.4 | 1.6-1.8 |
| Cage width Wc/ball diameter Db | 1.8-2.0 | more than 2.0 |
| Ball pitch circle diameter (PCD$_{BALL}$)/ball diameter Db | 3.3-3.6 | more than 3.6 |
| Spline pitch circle diameter (PCD$_{SPL}$)/ball diameter Db | 1.75-1.85 | less than 1.75 |
| Outer joint member outer diameter Do/spline PCD (PCD$_{SPL}$) | 2.7-3.0 | more than 3.0 |

Next, the performance characteristics of the plunging type constant velocity universal joint 1 for the propeller shaft in terms of vibration characteristics, reduction of heat generation, and increase in rotation speed will be described with reference to FIGS. 5 to 7.

Figure 5:
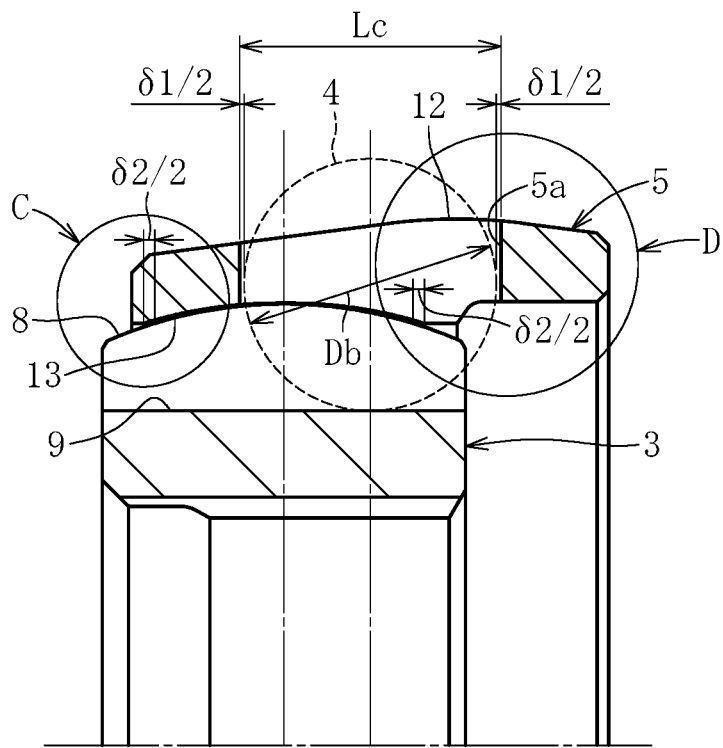
FIG. 5 is a longitudinal sectional view showing the inner joint member, cage, and ball of FIG. 2A at an enlarged scale.

As shown in FIG. 5, an axial pocket clearance δ1 is provided between the axially opposing wall surfaces of the pocket 5a of the cage 5 and the ball 4. Defining the dimension between the axially opposing wall surfaces of the pocket 5a of the cage 5 as Lc and the ball diameter of the ball 4 as Db, the pocket clearance δ1 is represented by δ1=Lc−Db.

Figure 6A:
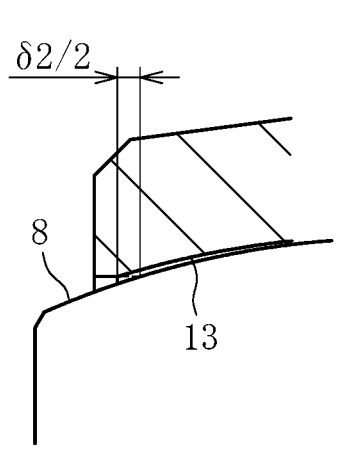
FIG. 6A is an enlarged view of portion C of FIG. 5.
Figure 6B:
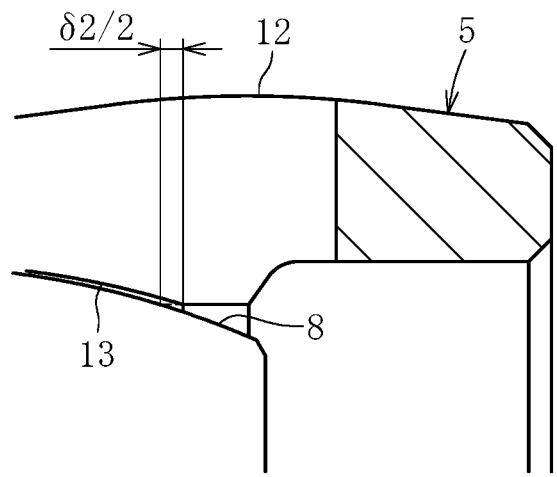
FIG. 6B is an enlarged view of portion D of FIG. 5.

As shown in FIG. 6, an axial clearance δ2 is provided between the spherical inner surface 13 of the cage 5 and the spherical outer surface 8 of the inner joint member 3. For example, the axial clearance δ2 is the amount of relative axial movement between the position where the spherical outer surface 8 of the inner joint member 3 abuts the spherical inner surface 13 of the cage 5 by moving the inner joint member 3 toward one side in the axial direction and the position where the spherical outer surface 8 of the inner joint member 3 abuts the spherical inner surface 13 of the cage 5 by moving the inner joint member 3 toward the other side in the axial direction, with the cage 5 fixed.

By providing the pocket clearance δ1 and the axial clearance δ2 as described above, the sliding resistance of the plunging type constant velocity universal joint 1 is reduced, the vibration characteristics of the vehicle can be improved, and the improvement in life of the plunging type constant velocity universal joint 1 can be expected due to the effect of temperature reduction. In particular, the use with propeller shafts is effective because they are used at a higher speed than drive shafts.

The pocket clearance δ1 is preferably set to 0 to 0.05 mm. The pocket clearance δ1 can exhibit its effect even if it is small. If the pocket clearance δ1 is larger than 0.05 mm, the amount of deviation of the ball 4 from the bisector plane of the operating angle is increased, which may lead to decrease in the constant speed property and durability of the plunging type constant velocity universal joint 1.

The axial clearance δ2 is preferably set to about 0.5 to 1.5 mm. If the axial clearance δ2 is smaller than 0.5 mm, the amount of vibration (axial amplitude) from the engine cannot be absorbed by the amount of relative axial movement between the inner joint member 3 and the cage 5, and the vibration may be propagated. On the other hand, if the axial clearance δ2 is larger than 1.5 mm, the amount of deviation of the ball 4 from the bisector plane of the operating angle is increased, which may lead to decrease in the constant speed property and durability of the plunging type constant velocity universal joint 1.

Figure 7A:
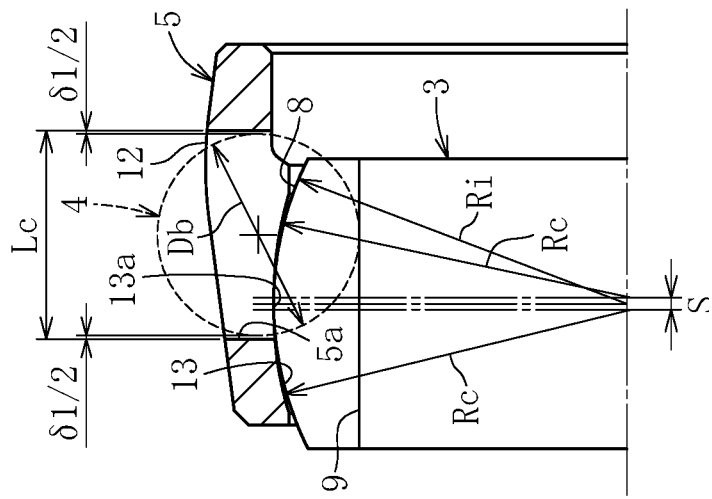
FIG. 7A is a longitudinal sectional view showing an inner joint member, a cage, and a ball in a standard design in which a pocket clearance δ1 and an axial clearance δ2 are not provided.

Designs of the pocket clearance δ1 and the axial clearance δ2 will be described with reference to FIGS. 7A, 7B, and 7C. In the standard design shown in FIG. 7A, the axial pocket clearance δ1 is not provided between the axially opposing wall surfaces of the pocket 5a of the cage 5 and the ball 4. Regarding a radius of curvature Rc of the spherical inner surface 13 of the cage 5 and a radius of curvature Ri of the spherical outer surface 8 of the inner joint member 3, although there is a slight spherical clearance for sliding guide, substantially Rc≈Ri and no axial clearance δ2 is provided.

Figure 7B:
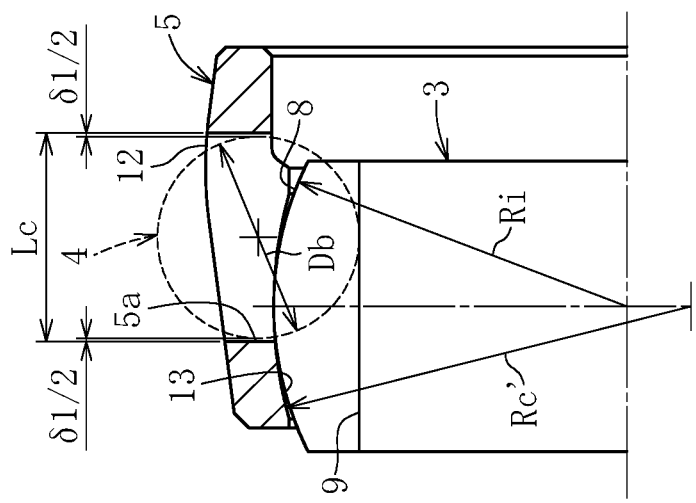
FIG. 7B is a longitudinal sectional view showing an inner joint member, a cage, and a ball in a design in which the pocket clearance δ1 and the axial clearance δ2 are provided.
Figure 7C:
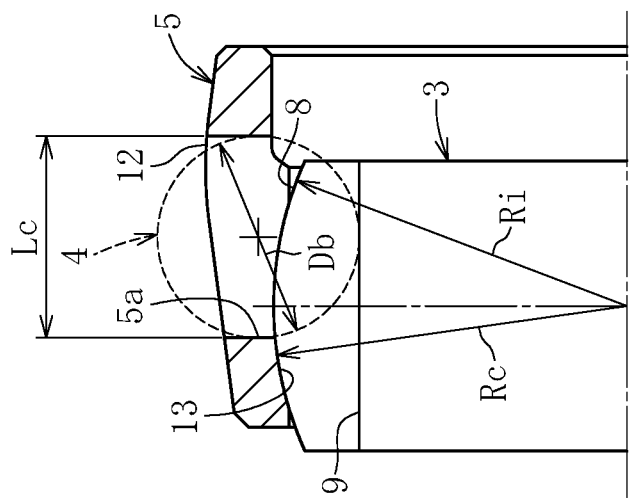
FIG. 7C is a longitudinal sectional view showing an inner joint member, a cage, and a ball in another design in which the pocket clearance δ1 and the axial clearance δ2 are provided.

The plunging type constant velocity universal joint 1 according to the present embodiment has a design in which the pocket clearance δ1 and the axial clearance δ2 are provided (see FIG. 5) as shown in FIGS. 7B and 7C. In the design shown in FIG. 7B, the pocket clearance δ1 is provided, and the radius of curvature Rc' of the spherical inner surface 13 of the cage 5 is made larger than the radius of curvature Ri of the spherical outer surface 8 of the inner joint member 3, and the center of curvature of the radius of curvature Rc' is radially offset from the axial center of the cage 5. In this manner, the spherical outer surface 8 of the inner joint member 3 and the spherical inner surface 13 of the cage 5 abut at the axial direction-center of the inner joint member 3, while the axial clearance δ2 is formed on both sides of the inner joint member 3 (see FIG. 5).

FIG. 7C shows another design in which the pocket clearance δ1 and the axial clearance δ2 are provided. In this design, while the spherical outer surface 8 of the inner joint member 3 is formed of a single spherical surface having a radius of curvature Ri, the spherical inner surface 13 of the cage 5 has a cylindrical portion 13a formed in area S at a position corresponding to the axial direction-center of the inner joint member 3, and spherical surfaces having a radius of curvature Rc are smoothly connected to both ends of the cylindrical portion 13a. Regarding the radius of curvature Rc of the spherical inner surface 13 of the cage 5 and the radius of curvature Ri of the spherical outer surface 8 of the inner joint member 3, although there is a slight spherical clearance for sliding guide, substantially Rc Ri. In this design, when the cage 5 and the inner joint member 3 relatively move in the axial direction, the axial direction-center of the spherical outer surface 8 of the inner joint member 3 is slidably guided by the cylindrical portion 13a, so that smooth relative movement can be achieved.

It is apparent that the present invention is not limited to the embodiments described above and can be implemented in various forms without departing from the spirit of the present invention, and the scope of the invention is defined by the claims and encompasses meanings equivalent to those recited in the claims and any modifications that fall within the scope.

REFERENCE SIGNS LIST 1 plunging type constant velocity universal joint for propeller shaft
2 outer joint member
3 inner joint member
4 torque transmitting ball
5 cage
102 propeller shaft
107 propeller shaft
O1 center of curvature of spherical outer surface of cage
O2 center of curvature of spherical inner surface of cage
O3 center of pocket of cage

The invention claimed is:

1. A plunging type constant velocity universal joint for a propeller shaft, the plunging type constant velocity universal joint comprising:
an outer joint member having eight straight track grooves formed along an axial direction on a cylindrical inner surface;
an inner joint member having eight straight track grooves formed along the axial direction on a spherical outer surface and opposing the straight track grooves of the outer joint member and a connecting hole in which female splines are formed;
eight torque transmitting balls disposed between the straight track grooves of the outer joint member and the straight track grooves of the inner joint member; and
a cage having pockets accommodating the torque transmitting balls, a spherical outer surface guided in contact with the cylindrical inner surface of the outer joint member, and a spherical inner surface guided in contact with the spherical outer surface of the inner joint member, wherein
a center of curvature of the spherical outer surface and a center of curvature of the spherical inner surface of the cage each have an equal and axially opposite offset (f) with respect to a center of the pockets,
the plunging type constant velocity universal joint is configured to have a maximum operating angle that is set to 15° or less,
a ratio $f/PCD_{BALL}$ between the offset (f) of the cage and a pitch circle diameter ($PCD_{BALL}$) of the torque transmitting balls is 0.07 or more and 0.09 or less,
a ratio $Ti/Db$ between a wall thickness Ti of the inner joint member and a ball diameter Db of the torque transmitting balls is 0.30 or more and 0.45 or less,
a ratio $PCD_{BALL}/Db$ between the pitch circle diameter $PCD_{BALL}$ of the torque transmitting balls and the ball diameter Db of the torque transmitting balls is 3.3 or more and 3.6 or less, and
a ratio $Wc/Db$ between an axial width Wc of the cage and the ball diameter Db of the torque transmitting balls is 1.8 or more and 2.0 or less.

2. The plunging type constant velocity universal joint for a propeller shaft according to claim 1, wherein
a ratio $Wi/Db$ between an axial width Wi of the inner joint member and the ball diameter Db of the torque transmitting balls is 1.2 or more and 1.4 or less.

3. The plunging type constant velocity universal joint for the propeller shaft according to claim 2, wherein a ratio $PCD_{SPL}/Db$ between a pitch circle diameter $PCD_{SPL}$ of the female splines of the inner joint member and the ball diameter Db of the torque transmitting balls is 1.75 or more and 1.85 or less.

4. The plunging type constant velocity universal joint for the propeller shaft according to claim 2, wherein a ratio $Do/PCD_{SPL}$ between an outer diameter Do of the outer joint member and a and the pitch circle diameter $PCD_{SPL}$ of the female splines of the inner joint member is 2.7 or more and 3.0 or less.

5. The plunging type constant velocity universal joint for the propeller shaft according to claim 2, wherein a pocket clearance δ1 is provided between axially opposing wall surfaces of the pockets and the torque transmitting balls, and an axial clearance δ2 is provided between the spherical inner surface of the cage and the spherical outer surface of the inner joint member.

6. The plunging type constant velocity universal joint for the propeller shaft according to claim 5, wherein the pocket clearance δ1 is more than 0 and 0.050 mm or less, and the axial clearance δ2 is 0.5 to 1.5 mm.

7. The plunging type constant velocity universal joint for a propeller shaft according to claim 1, wherein
a ratio $To/Db$ between a wall thickness To of the outer joint member and the ball diameter Db of the torque transmitting balls is 0.25 or more and 0.29 or less.

8. The plunging type constant velocity universal joint for the propeller shaft according to claim 7, wherein a ratio $PCD_{SPL}/Db$ between a pitch circle diameter $PCD_{SPL}$ of the female splines of the inner joint member and the ball diameter Db of the torque transmitting balls is 1.75 or more and 1.85 or less.

9. The plunging type constant velocity universal joint for the propeller shaft according to claim 7, wherein a ratio $Do/PCD_{SPL}$ between an outer diameter Do of the outer joint member and a and the pitch circle diameter $PCD_{SPL}$ of the female splines of the inner joint member is 2.7 or more and 3.0 or less.

10. The plunging type constant velocity universal joint for the propeller shaft according to claim 7, wherein a pocket clearance δ1 is provided between axially opposing wall surfaces of the pockets and the torque transmitting balls, and an axial clearance δ2 is provided between the spherical inner surface of the cage and the spherical outer surface of the inner joint member.

11. The plunging type constant velocity universal joint for the propeller shaft according to claim 10, wherein the pocket clearance δ1 is more than 0 and 0.050 mm or less, and the axial clearance δ2 is 0.5 to 1.5 mm.

12. The plunging type constant velocity universal joint for the propeller shaft according to claim 1,
wherein a ratio $PCD_{SPL}/Db$ between a pitch circle diameter $PCD_{SPL}$ of the female splines of the inner joint member and the ball diameter Db of the torque transmitting balls is 1.75 or more and 1.85 or less.

13. The plunging type constant velocity universal joint for the propeller shaft according to claim 1, wherein a ratio $Do/PCD_{SPL}$ between an outer diameter Do of the outer joint member and a pitch circle diameter $PCD_{SPL}$ of the female splines of the inner joint member is 2.7 or more and 3.0 or less.

14. The plunging type constant velocity universal joint for the propeller shaft according to claim 1, wherein a pocket clearance M is provided between axially opposing wall surfaces of the pockets and the torque transmitting balls, and an axial clearance δ2 is provided between the spherical inner surface of the cage and the spherical outer surface of the inner joint member.

15. The plunging type constant velocity universal joint for the propeller shaft according to claim 14, wherein the pocket clearance δ1 is more than 0 and 0.050 mm or less, and the axial clearance δ2 is 0.5 to 1.5 mm.

16. A plunging type constant velocity universal joint for a propeller shaft, the plunging type constant velocity universal joint comprising:
- an outer joint member having eight straight track grooves formed along an axial direction on a cylindrical inner surface;
- an inner joint member having eight straight track grooves formed along the axial direction on a spherical outer surface and opposing the straight track grooves of the outer joint member and a connecting hole in which female splines are formed;
- eight torque transmitting balls disposed between the straight track grooves of the outer joint member and the straight track grooves of the inner joint member; and
- a cage having pockets accommodating the torque transmitting balls, a spherical outer surface guided in contact with the cylindrical inner surface of the outer joint member, and a spherical inner surface guided in contact with the spherical outer surface of the inner joint member, wherein
- a center of curvature of the spherical outer surface and a center of curvature of the spherical inner surface of the cage each have an equal and axially opposite offset (f) with respect to a center of the pockets,
- an inclination angle β of a conical stopper surface provided on an outer periphery of the cage is formed at 7.5°,
- a ratio $f/PCD_{BALL}$ between the offset (f) of the cage and a pitch circle diameter ($PCD_{BALL}$) of the torque transmitting balls is 0.07 or more and 0.09 or less,
- a ratio Ti/Db between a wall thickness Ti of the inner joint member and a ball diameter Db of the torque transmitting balls is 0.30 or more and 0.45 or less,
- a ratio $PCD_{BALL}$/Db between the pitch circle diameter $PCD_{BALL}$ of the torque transmitting balls and the ball diameter Db of the torque transmitting balls is 3.3 or more and 3.6 or less, and
- a ratio Wc/Db between an axial width Wc of the cage and the ball diameter Db of the torque transmitting balls is 1.8 or more and 2.0 or less.

* * * * *